United States Patent
Knobbe et al.

(10) Patent No.: US 11,530,950 B2
(45) Date of Patent: Dec. 20, 2022

(54) SPECTRAL ANALYSIS SYSTEM, MOBILE DEVICE HAVING A SPECTRAL ANALYSIS SYSTEM, METHOD FOR DETERMINING A CORRECTION FUNCTION FOR THE IMAGING CORRECTION OF A SPECTRUM CAPTURED BY A SPECTRAL ANALYSIS SYSTEM, AND COMPUTER PROGRAM

(71) Applicant: Fraunhofer-Gesellschaft zur Foerderung der angewandten Forschung e.V., Munich (DE)

(72) Inventors: Jens Knobbe, Dresden (DE); Heinrich Grueger, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 69 days.

(21) Appl. No.: 17/067,445

(22) Filed: Oct. 9, 2020

(65) Prior Publication Data

US 2021/0025755 A1   Jan. 28, 2021

Related U.S. Application Data

(63) Continuation of application No. PCT/EP2019/058827, filed on Apr. 8, 2019.

(30) Foreign Application Priority Data

Apr. 10, 2018  (DE) ..................... 10 2018 205 400.2

(51) Int. Cl.
*G01J 3/02* (2006.01)
*G01J 3/28* (2006.01)
*G01J 3/10* (2006.01)

(52) U.S. Cl.
CPC ............... *G01J 3/2823* (2013.01); *G01J 3/10* (2013.01); *G01J 3/2803* (2013.01); *G01J 3/0208* (2013.01)

(58) Field of Classification Search
CPC .... G01J 3/02; G01J 3/2823; G01J 3/10; G01J 3/2803; G01J 3/0208; G01J 3/0286; G01N 21/274
See application file for complete search history.

(56) References Cited

U.S. PATENT DOCUMENTS

| | | | |
|---|---|---|---|
| 3,646,331 | A | 2/1972 | Lord |
| 6,002,479 | A | 12/1999 | Barwicz et al. |
| 6,263,077 | B1 * | 7/2001 | Zuranski ............... H04L 1/0057 |
| | | | 379/93.28 |
| 2008/0059100 | A1 | 3/2008 | Smous et al. |
| 2008/0297796 | A1 | 12/2008 | Lukas et al. |
| 2012/0327416 | A1 | 12/2012 | Simons et al. |

(Continued)

FOREIGN PATENT DOCUMENTS

| | | |
|---|---|---|
| AU | 2490395 A | 1/1996 |
| CA | 2237970 C | 12/2006 |
| DE | 102006045033 A1 | 3/2008 |

(Continued)

*Primary Examiner* — Abdullahi Nur
(74) *Attorney, Agent, or Firm* — Perkins Coie LLP; Michael A. Glenn

(57) ABSTRACT

Spectral analysis system for capturing a spectrum with an optic that forms an optical path. The spectral analysis system is configured to apply a correction function to a captured spectrum so as to obtain a modified spectrum.

28 Claims, 10 Drawing Sheets

(56) References Cited

U.S. PATENT DOCUMENTS

2013/0116517 A1    5/2013  Jungmann et al.
2019/0204151 A1*  7/2019  Lin ......................... G01J 3/28

FOREIGN PATENT DOCUMENTS

| | | |
|---|---|---|
| DE | 102010014593 A1 | 10/2011 |
| EP | 0983490 B1 | 7/2002 |
| JP | S5544942 A | 3/1980 |
| JP | H10300580 A | 11/1998 |
| WO | 2007047732 A2 | 4/2007 |

* cited by examiner

SPECTRAL ANALYSIS SYSTEM, MOBILE DEVICE HAVING A SPECTRAL ANALYSIS SYSTEM, METHOD FOR DETERMINING A CORRECTION FUNCTION FOR THE IMAGING CORRECTION OF A SPECTRUM CAPTURED BY A SPECTRAL ANALYSIS SYSTEM, AND COMPUTER PROGRAM

CROSS-REFERENCES TO RELATED APPLICATIONS

This application is a continuation of copending International Application No. PCT/EP2019/058827, filed Apr. 8, 2019, which is incorporated herein by reference in its entirety, and additionally claims priority from German Application No. DE 10 2018 205 400.2, filed Apr. 10, 2018, which is incorporated herein by reference in its entirety.

Embodiments according to the invention relate to a spectrometer, a mobile device with a spectrometer, a method for determining a correction function for the imaging correction of a spectrum captured by a spectrometer, and a computer program.

BACKGROUND OF THE INVENTION

Different methods for improving/increasing the spectral resolution in spectral apparatuses are known in the conventional technology.

The traditional, therefore widely used, method is based on a careful aberration correction during the optical calculation on the one hand, and on adjustment processes, in particular a focus adjustment, after the assembly of the full system on the other hand. To this end, degrees of freedom in the form of actuators of different implementations are usually provided. Although very often used, these two measures have disadvantages. The correction of aberrations of the optic often leads to complex optical functional surfaces and narrow tolerances. The use of mechanical actuators represents a considerable additional mechanical effort and therefore additional costs, and it furthermore prevents mass production of spectral apparatuses, since an adjustment process is very time consuming. Due to the space requirement of the actuators, the need for adjustment stands in the way of miniaturization as well. Strictly speaking, however, this approach is not an improvement/increase of the spectral resolution of certain types of devices, but rather a constructive assurance of the same. In any case, the usual method for miniaturized systems and high quantities does not lead to the desired result.

On the other hand, methods that enable an improvement of the spectral resolution by means of signal processing are also known. In this case, comparison spectra are initially captured with a high-resolution spectral apparatus so as to create a correction function. The method described in EP 0983490 B1 is mentioned here as an example for this approach. However, this method involves the comparison of spectra of the same samples captured with different spectral apparatuses and possibly leads to comparatively complex data processing.

Furthermore, methods for reconstructing spectral data are known in the field of spectral imaging. However, this involves a targeted active modification of the irradiance distribution in the optical path during the measurement process. Such methods are known under the term "coded aperture" and, e.g., are described in WO 2007047732 A2. The need for active manipulation during the measurement and the requirement of using matrix image sensors ultimately lead to the fact that this method is not expedient in the context of the present invention.

Methods in which an improvement of the image quality, in particular of the image sharpness, is achieved by means of suitable correction algorithms are known in the field of imaging systems. These methods are often based on the knowledge of the point spread function or other features such as motion processes of the objects to be imaged ("motion blur"). Such methods are used in industrial metrology/image processing or field monitoring/photogrammetry. However, the methods used in this context are only applicable to a very limited extent to spectral apparatuses, since questions of wavelength calibrations that are not relevant for the above-mentioned applications have to be considered here. Furthermore, in the examples mentioned above, these methods are usually not specifically included in the optimization process of the hardware, but are used to solve specific problems such as motion blur or depth of field problems. There is only a topical relationship with a spectral apparatus in that a potentially faulty optical image also occurs in such an apparatus. The algorithms used are usually iterative methods. In this case, the convergence of the iteration has to be ensured and the formation of image artifacts has to be avoided. This often leads to a less than optimal compromise solution.

In spectroscopy, dispersive spectral apparatuses, i.e. spectrometers, spectrographs, monochromators and polychromators, in which spectral division is performed with a diffraction grating or prism, are often used to capture the spectrum of electromagnetic radiation, particularly in the ultraviolet (UV), visible (VIS) and infrared (IR) spectral ranges. An important performance parameter in such devices is the spectral resolution. Since dispersive spectral apparatuses are optically imaging systems, the resolution is determined, among other things, by the optical imaging performance. The entry slit of the spectral apparatus should be imaged as sharply as possible onto an exit slit, or alternatively on a line detector or camera chip. Thus, optical aberrations, including a possible focus error, should be corrected as well as possible.

The requirements with respect to the imaging performance of the spectral apparatus have so far forced the use of a complex process in the development and production of such devices. In a to some extent complex optical calculation, the optical aberrations are corrected, or greatly reduced, by optimized optical components and a clever arrangement of these components. This often leads to narrowly tolerated parts and small assembly tolerances. Additional adjustment steps for selected components of the system are integrated into the assembly processes so as to reduce remaining errors by adjustment, or, e.g., to optimize the focus setting.

This approach has proven to be problematic for the development and production of spectral apparatuses in large quantities and/or very small devices. In the production of large quantities, any kind of adjustment processes are no longer feasible due to time restrains and costs. Furthermore, the often narrowly tolerated optical components lead to unjustifiable costs. This circumstance currently prevents the mass production of powerful spectral apparatuses and therefore the use of such devices in corresponding applications, e.g. environmental metrology and food safety.

In light of the above, there is a need for a concept that enables a better compromise between increasing the spectral resolution of a spectral apparatus, or ensuring the resolution in comparison to commercial systems, producing a spectral apparatus in large quantities and as a very small system, loosening tolerances of optical components built into a spectral apparatus, and reducing costs.

SUMMARY

An embodiment may have a spectral analysis system for capturing a spectrum with an optic that forms an optical path, wherein spectral analysis system is configured to apply a correction function to a captured spectrum so as to acquire a modified spectrum.

Another embodiment may have a mobile device having integrated a spectral analysis system for capturing a spectrum with an optic that forms an optical path, wherein spectral analysis system is configured to apply a correction function to a captured spectrum so as to acquire a modified spectrum.

According to another embodiment, a method for determining a correction function for a spectrum captured by a spectral analysis system may have the steps of: capturing a reference spectrum of a reference radiation source with the spectral analysis system so as to acquire a captured reference spectrum, wherein the spectrum of the reference radiation source includes a peak with a spectral width that is smaller than a spectral resolution performance of the spectral analysis system, creating a correction function from the captured reference spectrum so that, when applying the correction function to captured spectra captured by the spectral analysis system, modified spectra that are less impaired by errors of an optic of the spectral analysis system are acquired.

Another embodiment may have a non-transitory digital storage medium having a computer program stored thereon to perform the method for determining a correction function for a spectrum captured by a spectral analysis system, having the steps of: capturing a reference spectrum of a reference radiation source with the spectral analysis system so as to acquire a captured reference spectrum, wherein the spectrum of the reference radiation source includes a peak with a spectral width that is smaller than a spectral resolution performance of the spectral analysis system, creating a correction function from the captured reference spectrum so that, when applying the correction function to captured spectra captured by the spectral analysis system, modified spectra that are less impaired by errors of an optic of the spectral analysis system are acquired, when said computer program is run by a computer.

An embodiment concerns a spectral analysis system for capturing a spectrum with an optic that forms an optical path. The optic may be an imaging or beam-shaping optic. The spectral analysis system, herein referred to as spectrometer, is configured to apply a correction function to a captured spectrum so as to obtain a modified spectrum (corrected spectrum). A memory having stored the correction function may be located in the spectrometer or it may be provided externally. A processing means for applying the correction function to the captured spectrum so as to obtain the corrected spectrum may also be located in the spectrometer or it may be provided externally. The optic may comprise aberrations such as spherical aberrations, astigmatism, coma, defocus, and/or chromatic aberrations. For example, due to aberrations of the optic, the captured spectrum deviates from the spectrum actually to be captured. Due to the fact that the processing means of the spectrometer applies the correction function to the captured spectrum, the influence of aberrations of the optic to the captured spectrum may be reduced. Thus, with this spectrometer, a corrected spectrum having a better resolution than the captured spectrum of the spectrometer due to smaller optical aberrations is obtained. For example, the corrected spectrum only differs slightly from the spectrum to be actually captured.

This embodiment of the spectrometer is based on the finding that, by applying the correction function to the captured spectrum, aberrations of the optic of the spectrometer may be compensated to such an extent that aberrations of the spectrometer no longer have to be compensated by mechanically adjusting components of the spectrometer, such as the optic. For example, the captured spectra may be processed by means of the spectral analysis system such that the spectrometer with aberrations comprises a corrected spectrum that differs only slightly from the spectrum actually to be captured. Thus, with this spectrometer, it is possible to increase the spectral resolution of the spectral apparatus by applying the correction function to the captured spectrum. The corrected spectrum of the spectrometer is more similar to the spectrum actually to be captured than the captured spectrum. In addition, for example, the spectrometer may be produced in large quantities and as a very small system, since, with this spectrometer, aberrations of the optic no longer have to be rectified afterwards by adjustment and very small tolerances of the optic no longer have to be accepted. For example, due to the fact that the optic may comprise large tolerances, it is easier to produce the individual components of the spectrometer and to subsequently assemble them, enabling mass production. In addition, the spectrometer described herein enables production of the spectrometer as a very small system. The smaller the production size of a spectrometer tends to be, the smaller the tolerance requirements of the optic of the spectrometer. Due to the small tolerance requirements of the components of the spectrometer, such as the optic, the production of small spectrometers is a very elaborate and cost-intensive. In addition, for example, it is hard to introduce adjustment elements into small spectrometers so as to be able to reduce aberrations after the production of the spectrometer. The spectrometer described herein may be manufactured without elaborate and cost-intensive production processes since aberrations caused by the optical hardware of the spectrometer do not have to be compensated during production, e.g., but may be compensated by means of software. The spectrometer described herein may comprise aberrations, since, by applying the correction function to the captured spectrum, the spectrometer reduces the influence of the aberrations and therefore increases the spectral resolution of the spectrometer. Thus, the spectrometer described herein may be produced with very little effort as a small system. Due to the fact that the spectrometer may be realized as a small system, the spectrometer may be used in a mobile way. Thus, samples to be analyzed by the spectrometer no longer have to be transported to the laboratory. The samples may also be analyzed directly on site with the small mobile spectrometer.

Thus, it is to be noted that the spectrometer may increase the spectral resolution of the spectral apparatus with larger tolerances of the optical components, therefore enabling a cost-efficient production of the spectrometer in large quantities and/or as a very small system.

An embodiment concerns a mobile device having integrated therein the spectrometer. Thus, it is possible to use the spectrometer at different locations and not only at a stationary location such as a laboratory. By using the spectrometer described herein, the use of a spectrometer in a mobile device is made possible since the spectrometer with a good spectral resolution may be produced cost-efficiently and in large quantities.

An embodiment provides a method for determining a correction function for the imaging correction of a spectrum captured by the spectrometer. The method includes capturing a reference spectrum of a reference radiation source with a spectrometer so as to obtain a captured reference spectrum, wherein the spectrum of the reference radiation source comprises a spectral bandwidth that is smaller than a spectral resolution performance of the spectrometer, and creating a correction function from the captured reference spectrum so that, when applying the correction function to captured spectra captured by the spectrometer, corrected spectra that are less influenced by aberrations of an optic of the spectrometer are obtained. For example, a correction function with which the spectrometer may at least partially compensate specific aberrations, e.g. of the optic, of the spectrometer may be created by means of the method. Thus, for example, the spectral resolution of the spectrometer is optimized by the method.

An embodiment concerns a computer program having a program code for performing a method when the program runs on a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
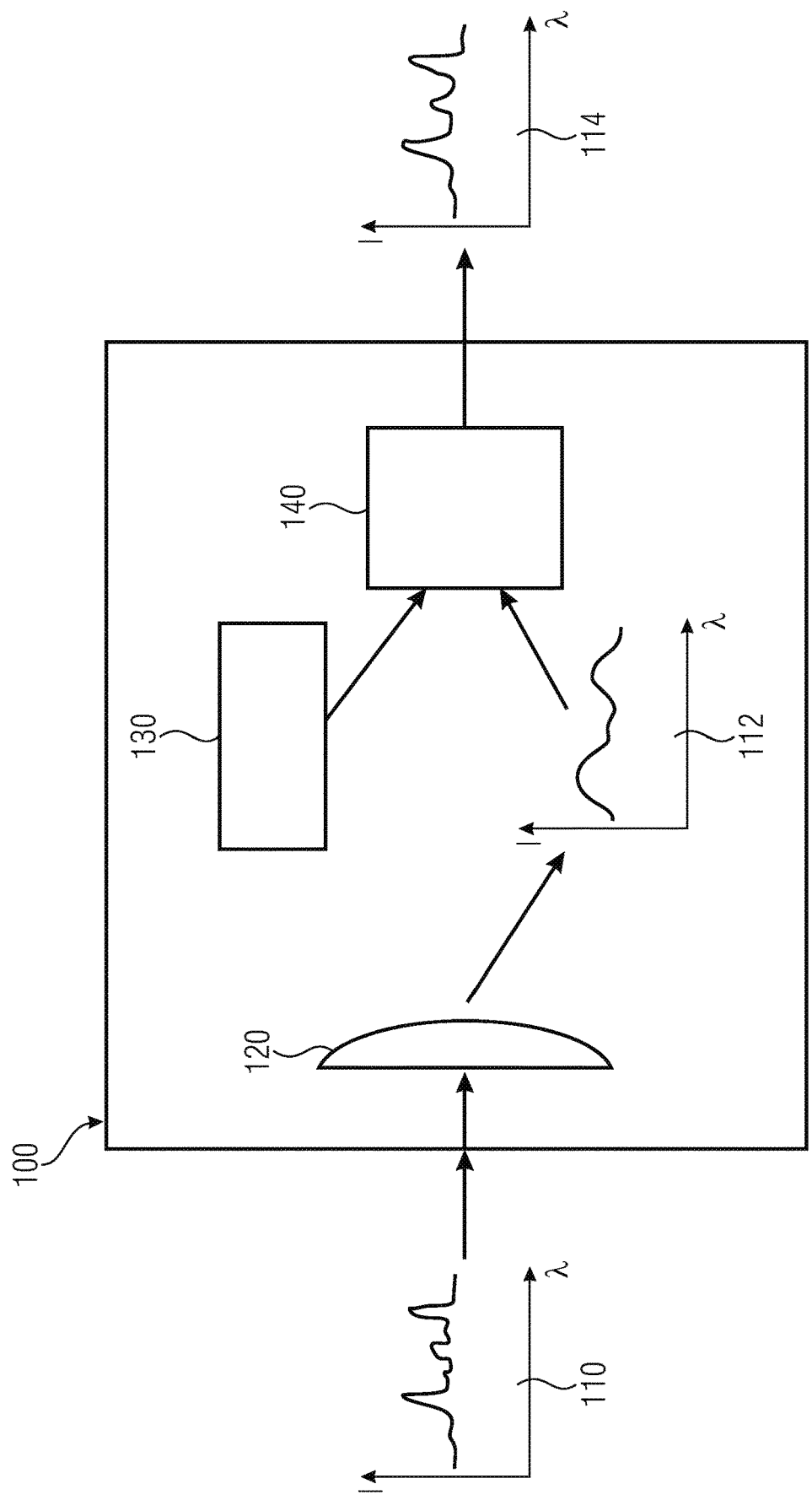
FIG. 1 shows a schematic illustration of a spectrometer according to an embodiment of the present invention.

Before embodiments of the present invention are subsequently described in more detail on the basis of the drawings, it is to be noted that identical or functionally identical elements, objects and/or structure, or elements, objects and/or structures with the same effect are provided in the different drawings with the same reference numerals so that the description of these elements illustrated in different embodiments is interchangeable, or may be applied to one another.

FIG. 1 shows a schematic illustration of a spectral analysis system 100 according to an embodiment of the present invention for capturing a spectrum 110 to be captured with an imaging optic 120. For example, the spectral analysis system, in the following referred to as spectrometer 100, includes a memory 130 having stored therein a correction function. In addition, e.g., the spectrometer 100 includes a processing means 140 for applying the correction function to a captured spectrum 112 so as to obtain a corrected spectrum 114.

FIG. 1 illustrates the spectrum 110 to be captured in a diagram, intensity against wavelength; however, the diagram with the spectrum to be captured does not have to be known. Instead, e.g., there may be a light source with an unknown spectrum to be captured, whose spectrum is to be captured, or there is radiation reflected from a sample or transmitted by the same. The radiation of the spectrum 110 to be captured falls into the spectrometer 100 and is guided and focused there by the imaging optic 120 while being spectrally split by a spectrum-splitting element of the spectrometer 100. For example, the captured spectrum 112 obtained in such a way by the spectrometer 100 differs from the spectrum 110 to be captured, e.g., in that it is modified (impaired) by aberrations of the imaging optic 110 of the spectrometer 100. The larger the aberrations of the imaging optic 120 of the spectrometer 100, e.g., the larger the deviation of the captured spectrum 112 with respect to the spectrum 110 to be captured. In order to increase the resolution performance (the spectral resolution performance) of the spectrometer 100, the captured spectrum 112 is forwarded to the processing means 140. The processing means 140 retrieves the correction function from the memory 130 and applies the same to the captured spectrum 112 so as to obtain the corrected spectrum 114.

Thus, the correction function may enable a spectral apparatus configuration with which the spectral resolution of a spectral apparatus (spectrometer 100) having aberrations (including defocus) may be increased by way of calculation, i.e. without engaging with the optomechanical hardware of the system. When building spectral apparatuses, in particular with very large quantities and very small systems, this makes it possible to do without the conventional process of adjustment and/or to no longer correct certain aberrations and to therefore loosen tolerances and significantly save costs in the future. Aberrations are consciously accepted, their effects with respect to the resolution being corrected in the signal (spectrum) later on, so to speak.

In an embodiment, the correction function is present in the form of a matrix, resulting in the corrected spectrum 114 when applied to the captured spectrum 112. The corrected spectrum 114 is obtained by a map in the form of a matrix multiplication with the captured spectrum 112. For example, the matrix may be obtained by inversion of a matrix that distributes each spectral sample value of an actual or undisturbed spectrum with a given impulse response onto the spectrally corresponding sample value and the spectrally surrounding sample values of a simulated captured spectrum and that accumulates the thus obtained contributions for all sample values of the simulated captured spectrum, i.e. by means of an inversion of a matrix that, so to speak, simulates the aberration-created deviation of the captured spectrum from an undisturbed spectrum, wherein the impulse response may be determined by measuring a captured spectrum 112 of a reference radiation source, as will be described in the following. In this case, the reference radiation source, e.g. a laser, a LED, a narrow-band thermal radiation source or a combination of a light source and a monochromator, may capture a spectrum 110 to be captured having a bandwidth that is smaller than a spectral resolution performance of the spectrometer. The invertibility of the matrix is an advantage. Determining the correction matrix by means of inversion of a matrix assembled from one or several measured impulse responses is successful since this impulse response matrix, i.e. the synthetic mapping matrix assembled from the individual spectral impulse responses, is fundamentally regular and therefore invertible. This enables the use of non-iterative correction methods with large advantages in terms of time and accuracy. In addition, there are no, or hardly any, algorithm-caused artifacts present. In any case, exact knowledge of the entire spectrum of the reference radiation source is not necessary, but, e.g., only of the position of the maximum spectral line. In particular, the shape of individual spectral lines or of narrow bands is then no longer significant, for example, since the spectral width is significantly smaller than the resolution of the spectrometer, as per definition. Thus, the possible inaccuracy of the wavelength position of the corresponding line is therefore neglectable. Due to the fact that the correction function is present in the form of a matrix, the processing means 140 may apply the correction function to the captured spectrum 112 in a performance-efficient manner so as to obtain the corrected spectrum 114, since, in this case, applying the correction function consists only of a matrix multiplication of a vector consisting of the sample values of the captured spectrum, and the correction matrix. For example, typical sizes for such matrixes are approximately 256×256, or 512×512, 1024×1024, or even larger, depending on the spectral range and the requested spectral resolution. Thus, the correction matrix may have the size of m×n, wherein n,m>128, e.g., wherein n corresponds to the number of spectral sample values of the captured spectrum, i.e. the number of spectral values of the spectrometer.

In an embodiment, the spectral analysis system 100 is configured to perform an integral transformation or a matrix manipulation when applying a correction function. For example, in the spectrometer 100 of FIG. 1, the processing means 140 is configured to perform matrix multiplication or, generally speaking, matrix manipulation when applying the correction function. However, if the correction function is known as a functional relationship, for example, the application of the correction function may also consist in a numerical convolution or inverse numerical convolution. In general, the application of the correction function may consist in an integral transformation. The integral transformation may therefore comprise a convolution or a FFT (Fast Fourier Transform) and/or the matrix manipulation may comprise a matrix multiplication. Due to the fact that previous knowledge about the captured spectrum with respect to its correction is not needed when applying the spectrometer, the effort in connection with the spectrum improvement is small. This enables applying the correction function to the captured spectrum 112 in a performance-efficient and time-efficient manner so as to obtain the corrected spectrum 114.

Figure 2:
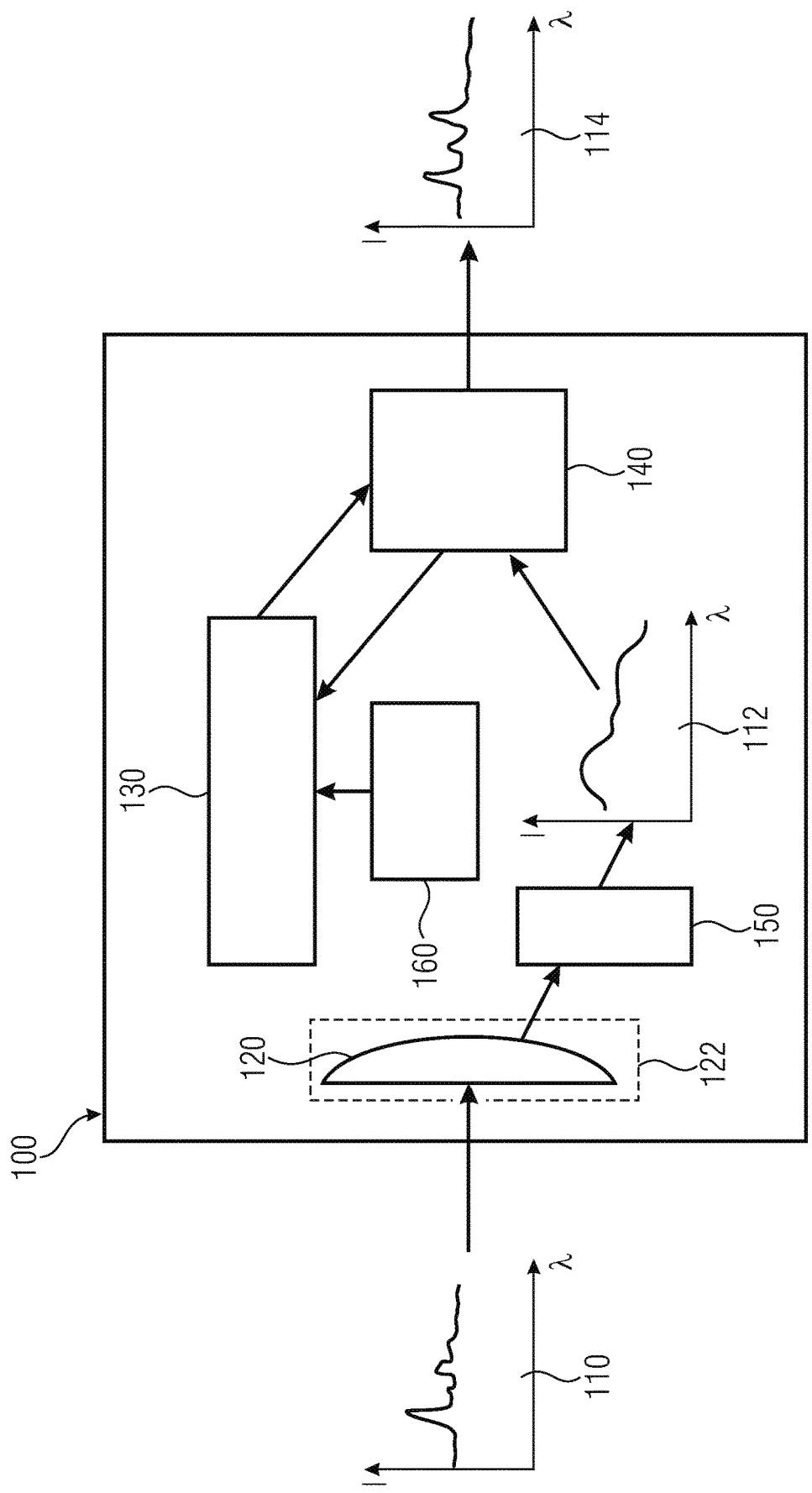
FIG. 2 shows a schematic illustration of a spectrometer with a sensor element according to an embodiment of the present invention.

FIG. 2 shows a schematic illustration of a spectrometer 100 for capturing a spectrum 110 to be captured with an optical system 122 according to an embodiment of the present invention. The optical system 122 with the imaging optic 120 is configured to spectrally divide electromagnetic radiation (of the spectrum 110 to be captured). In this case, for example, the optical system 122 is a monochromator, a polychromator, or a device configured to perform hyperspectral image capturing. Thus, the optical system 122 makes it possible for the spectrometer 100 to spectrally divide the electromagnetic radiation of the spectrum 110 to be captured and to therefore analyze the spectrum 110 to be captured with respect to its spectral composition.

In an embodiment, the optical system 122 does not comprise any adjustment elements and/or any mechanical actuators to correct aberrations after the production of the spectrometer 100. It is also possible that an entry opening, an exit opening, and components of the optical system 122 are mounted fixed and adjustment-free with respect to each other. In this case, for example, the electromagnetic radiation of the spectrum 110 to be captured enters into the optical system 122 of the spectrometer 100 through the entry opening, is spectrally divided in the optical system 122, and then exits spectrally divided via the exit opening of the optical system 122. In this case, for example, the components of the optical system 122 are positioned relative to each other such that the electromagnetic radiation is spectrally divided and, e.g., such that only radiation with a certain spectral bandwidth, which may be set, exits through the exit slit. For example, the radiation exiting through the exit opening of the optical system 122 is captured by a detector element 150 of the spectrometer 100. For example, due to the fact that the optical system 122 does not comprise adjustment elements and/or any mechanical actuators, that is due to the fact that, e.g., the entry opening, the imaging optic, the exit opening, and components of the optical system are mounted relative to each other in a fixed manner and adjustment-free, the spectrometer 100 may be produced in large quantities since modifications are no longer required after all elements of the optical system 122 of the spectrometer 100 have been arranged. Thus, e.g., the spectrometer 100 may be mass-produced since the elaborate adjustment processes after the production of the spectrometer 100 no longer have to be performed individually for each spectrometer 100. Since adjustment elements and mechanical actuators for correcting aberrations would need a lot of space in the spectrometer 100, the spectrometer 100 described herein may be realized as a small system without the adjustment elements and mechanical actuators. The entry and exit openings may be round, oval, rectangular, crescent-shaped, arched, rectangularly pulvinated, rectangularly drum-shaped, or shaped in any other way.

For example, the spectrometer 100 includes at least one detector element 150 configured to detect the electromagnetic radiation divided by the optical system 122. The captured spectrum 112 is created from the captured data of the at least one detector element 150. The captured spectrum 112 is forwarded to a processing means 140. The processing means 140 retrieves from a memory 130 a correction function that the processing means 140 applies to the captured spectrum 112 so as to obtain a corrected spectrum 114. For example, the memory 130 does not have to be located in the spectrometer 100, or the does not have to comprise the former, but the memory may be realized, e.g., as a cloud or in an external device which the means 140 may access and/or from which the means 140 obtains the correction function. For example, the processing means 140 may be connected to the memory 130 via a line or wireless, e.g. via WiFi, Bluetooth, ZigBee, etc. Additionally or alternatively, the processing means may be outsourced, the actual application may be performed in that the captured spectrum is transmitted to the processing means so as to perform the application in a delocalized way.

In an embodiment, the correction function stored in the memory 130 is generated by a method described in the following. To this end, the spectrum 110 to be captured comprises at least one spectral peak, i.e. a spectral line or a spectral band having a bandwidth that is smaller than a spectral resolution performance of the spectrometer 100. In other words, the spectrometer 100 captures the spectrum from a reference radiation source with a spectral peak comprising a bandwidth that is smaller than a spectral resolution performance of the spectrometer 100, for example. The spectrum of the reference radiation source does not have to be known in detail. For example, only the spectral position of the spectral maximum is known. The captured spectrum then represents, so to speak, the impulse response of the spectrometer to the spectral maximum (or the spectral line) of the reference source. If applicable, the process may be repeated for further spectral positions of the reference source spectral maximum. The captured spectrum 112 is forwarded to the processing means 140. For example, the captured spectrum 112 is used in the processing means 140 to form a matrix that distributes each spectral sample value of an actual or undisturbed spectrum with a given impulse response onto the spectrally corresponding sample value and the spectrally surrounding sample values of a simulated captured spectrum, and that accumulates the thus obtained contributions for all sample values of the simulated captured spectrum. This matrix then simulates, so to speak, the aberration-generated deviation of the captured spectrum from an undisturbed spectrum. Its columns would correspond to impulse responses for the different sample positions and would be derived from the one or the several captured spectra, e.g. by interpolation. For example, the processing means 140 then determines the correction function for the imaging correction of a spectrum 112 captured by the spectrometer 100. For example, the correction function may be determined by the processing means 140 by inverting the previously mentioned matrix. This inverted matrix may then be saved in the memory 130 as a correction function. Thus, it is possible for the spectrometer 100 to be able to determine on its own a correction function. As a result, the captured spectra 112 of the spectrometer 100 are corrected, or qualitatively improved, to become a corrected spectrum 114, since the correction function in the memory 130 at least partially reverses the individual aberrations of the imaging optic 120 of the spectrometer 100. Thus, for example, each spectrometer 100 has an individual correction function. This measure increases the spectral resolution of the spectrometer 100, and it becomes possible to compensate aberrations of the spectrometer 100 individually, as a result of which it possible to loosen tolerances of the optical components (of the imaging optic 120).

In an embodiment, the spectrometer 100 includes a sensor element 160 configured to detect an ambient condition. Alternatively, the spectrometer could also detect the ambient condition via external sensors and use the same as subsequently described. The spectrometer 100 is configured to determine the correction function depending on an ambient condition of the spectral analysis system 100, e.g. to look up a different function according to the present condition or to apply the same depending thereon, e.g. via ambient condition-specific correction manipulations, or correction functions. For example, the sensor element 160 may detect a temperature, humidity, and/or pressure of the atmosphere and/or combinations of these ambient conditions. For example, since the spectrometer 100 comprises the sensor element 160, the processing means 140 of the spectrometer 100 may read-out an ambient condition-dependent correction function from the memory 130 and apply the same to the captured spectrum 112 depending on the present ambient condition so as to obtain a corrected spectrum 114. Thus, the spectrometer 100 described herein is configured to increase the spectral resolution of the spectrometer by enabling to correct ambient condition-dependent aberrations. The ambient condition-dependent correction function may be determined by performing the previously described derivation of the correction function for different ambient conditions so as to obtain a set of correction functions, or to generate a correction function therefrom, e.g., which may be parametrized with respect to the ambient conditions. To this end, the ambient condition is protocolled when measuring the reference source spectrum.

In an embodiment, the spectrometer 100 is configured to determine, depending on ambient conditions, a correction function for the imaging correction of a spectrum (spectrum 110 to be captured) captured by a spectrometer. To this end, a reference spectrum is provided as the spectrum 110 to be captured, comprising a spectral peak with a bandwidth that is smaller than the spectral resolution performance of the spectrometer 100. The spectrum 110 to be captured is spectrally divided in the optical system 122 and is captured by the detector element 150. This creates the captured spectrum 112, and this captured spectrum 112 is forwarded to the processing means 140. For example, the sensor element 160 simultaneously captures the ambient conditions present during the measurement and transmits them to the memory 130. The processing means 140 converts the captured spectrum 112 into a correction function and transmits the same to the memory 130, where the correction function determined by the spectrometer 100 is stored together with the corresponding ambient conditions. The correction function has been determined by the spectrometer 100 such that, by applying the correction function, e.g. via the processing means 140 of the spectrometer 100, to captured spectra 112 captured by the spectrometer 100, corrected spectra 114 less affected by aberrations of an imaging optic 120 of the spectrometer 100 are obtained. Thus, for example, several correction functions at different ambient conditions may be present in the memory 130.

The above embodiments enable the production of spectrometers with a better ratio of production effort and accuracy. In EP 0983490 B1, an improvement of the spectral resolution of a spectrometer is enabled by means of signal processing. Comparison spectra are captured with a spectral apparatus of high resolution so as to create a correction function. However, this approach contains the comparison of spectra of the same samples captured with different spectral apparatuses, and might lead to a comparably elaborate data processing. The resolution improvement described therein is based on a comparison to a known spectrum of the same sample. On the other hand, the spectrometer described herein is based on the detection of properties of the spectrometer, regardless of known comparison spectra. This leads to a significantly more universal usability, since, in practice, the spectrum of samples to be measured is not known. In other words, a comparison spectrum is not needed in the spectrometer 100 described herein. Rather, the aberrations are determined once with sufficient accuracy and at least one correction function is determined therefrom. The correction function may reduce the influence of the aberrations on the captured spectrum for different spectral ranges. Since a reference radiation source having a bandwidth that is smaller than a spectral resolution performance of the spectrometer is used for determining the correction function, e.g., the correction function is a type of spectral point spread function (no comparison spectrum as in the conventional technology). Compared to the conventional technology, this provides a significant simplification and therefore enables a cost-efficient production and operation of large quantities of spectral apparatuses.

In addition, it is to be noted that a spectrometer 100 is understood to be a device that may consist of several assemblies with different functions. For example, an optical assembly (optical system 122) essentially represents the optical path for dividing the electromagnetic radiation to be measured (spectrum 110 to be captured) into its spectral portions. In this case, the assembly may comprise an optical component for dividing electromagnetic radiation in the form of a diffraction grating or prism. The grating may be a plane grating or concave grating or convex grating. In addition, the grating may itself be aberration-corrected (adapted shape and position of the individual grating lines). A prism may also comprise different shapes, e.g. plane shapes (normal triangular shape), or non-plane shapes (e.g. Féry Prism). For example, they may be monochromators, polychromators, or imaging polychromators. The electromagnetic radiation to be analyzed may be in the UV, VIS, or IR spectral ranges. For example, possible spectral ranges are VIS: 400 nm-100 nm, NIR: 800 nm-1600 nm, NIR: 1000 nm-1900 nm, NIR: 1150 nm-2300 nm, NIR: 1250 nm-2500 nm, IR: 3000 nm-6000 nm, or ranges in which the lower threshold is larger than or equal to 50% of the stated boundary, and the upper threshold is smaller than or equal to 200% of the stated boundary. For example, a further assembly includes the detector (the at least one detector element 150), having a corresponding drive electronics assembly for the detection of the radiation and the conversion into a measurement signal (captured spectrum 112). This may concern detectors with only one element or with several elements (line or matrix sensors). For example, in addition to the detector assembly, what is present is a further electronics assembly containing a data memory (memory 130), possibly enabling signal pre-processing, and configured for the communication with other devices, e.g. a PC.

The embodiments are based on the consideration of the system as a whole. In addition to "hardware", i.e. essentially the optical path with its optical components (optical system 122 with the imaging optic 120) and the detector with the associated electronics assembly, signal processing and data preparation are also understood as such ("holistic" system approach). This makes it possible to generate an optimized overall system taking into account specific advantages of the individual subsystems. In such an approach, the decisive factor is that not every subsystem has to be optimized in all aspects, but rather the interaction of the different parts is optimized in the system design. Compared to the conventional technology, this not only results in technical advantages but also in economic advantages.

For a good spectral resolution, the construction of spectrometers not only needs a good aberration correction (cost-intensive), but almost always an adjustment of the optical path (focus adjustment). This effort, particularly the adjustment, currently prevents the production of spectrometers in very large quantities at acceptable costs. In the spectrometer 100, the adjustment process is completely eliminated in favor of modified data processing. Within certain limits, this also applies to the correction of the system; certain aberrations such as defocus, spherical aberration, astigmatism, coma, field curvature, and/or chromatic aberration no longer need to be completely corrected, since the loss of resolution resulting from such errors can also be compensated by suitable data processing. For the spectrometer shown in FIG. 1, e.g., when loosening the tolerances and using a simple optical surface shape of the large concave mirror, which may be a spherical mirror, the significantly increasing errors of spherical aberration, astigmatism, and coma may be corrected, for example with the described matrix approach. The same applies to the defocus. This results in a significant cost advantage due to cheaper optical components and less narrow tolerances of components and the overall system.

Figure 3:
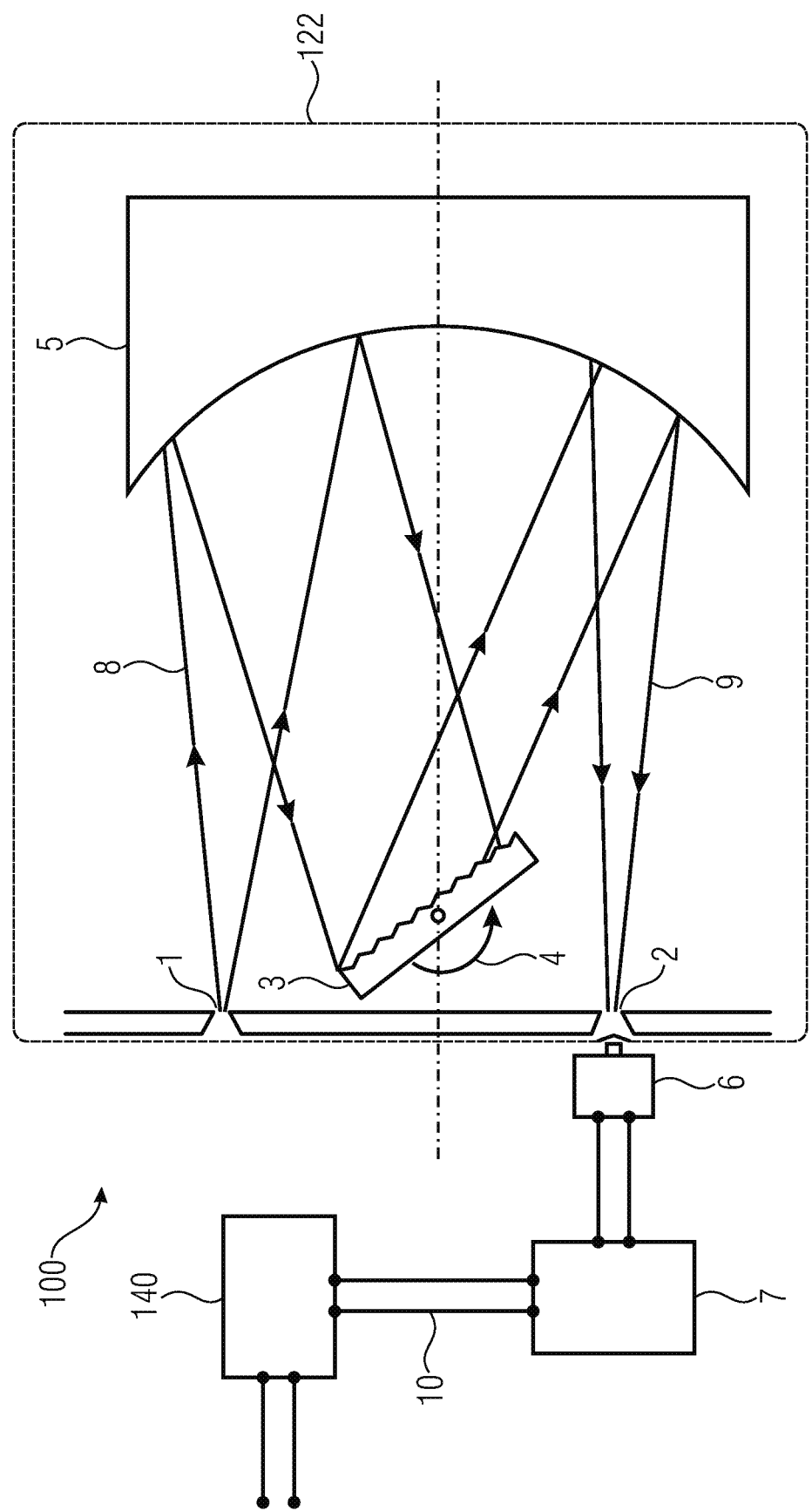
FIG. 3 shows a schematic illustration of a spectrometer with a detector element according to an embodiment of the present invention.

FIG. 3 shows a schematic illustration of a scanning spectrometer 100 according to an embodiment of the present invention. Electromagnetic radiation 8 enters the optical system 122 through an entry opening 1 (entry slit) and strikes a mirror 5 (imaging optic) that collimates the radiation and guides the same onto a diffraction grating 3 configured to be rotatable. A radiation portion 9 diffracted by the grating 3 again strikes the mirror 5 and is focused by the same onto the exit opening 2 (exit slit). A detector element 6 for detecting the radiation and subsequently converting the same into an electrical signal is located behind the exit opening 2. Additionally located in the spectrometer 100 is an electronic data memory 7 in which device-specific data correlated with the aberrations is saved. The memory 7 is electronically connected to the detector 6 and the periphery with data lines 10. For example, the memory 7 may comprise the same functions as the memory 130 in FIG. 1 and FIG. 2, and, for example, the detector element 6 may comprise the same functionalities as the at least one detector element 150 in FIG. 2. For example, the data detected by the detector element 6 with respect to the spectral characteristics of the electromagnetic radiation 8 is saved as a spectral intensity distribution in the form of a matrix in the memory 7. For example, the processing means 140 retrieves the captured spectrum, e.g. in the form of a matrix, and the device-specific data correlated with the aberrations from the memory 7 so as to convert the captured spectrum into a corrected spectrum. In order to convert the same, the processing means 140 applies to the captured spectrum a correction function in the form of the device-specific data correlated with the aberrations. Capturing the spectrum is carried out by rotating 4 the grating 3 in the spectrometer 100 and sequentially capturing the signal at the detector 6. The subsequent further processing of the data may be carried out in another part of the electronics assembly, such as in the processing means 140.

Figure 4B:
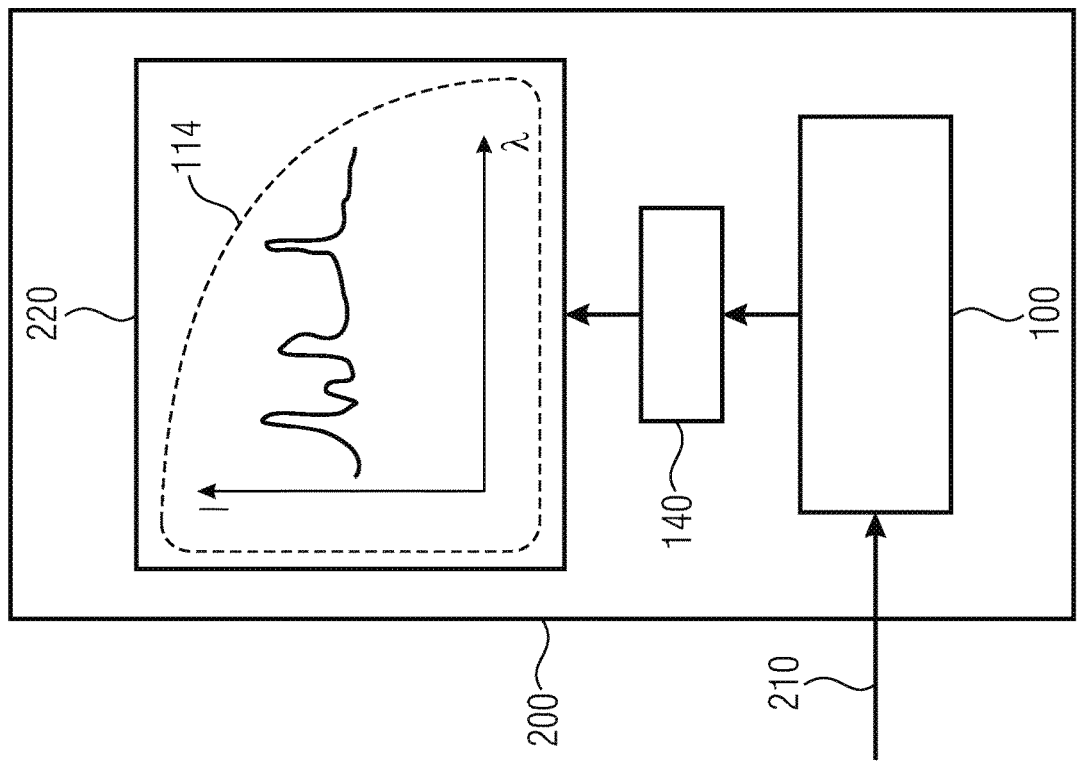
FIG. 4b shows a schematic illustration of a mobile device with a spectrometer and a processing means integrated into the mobile device according to an embodiment of the present invention.
Figure 4A:
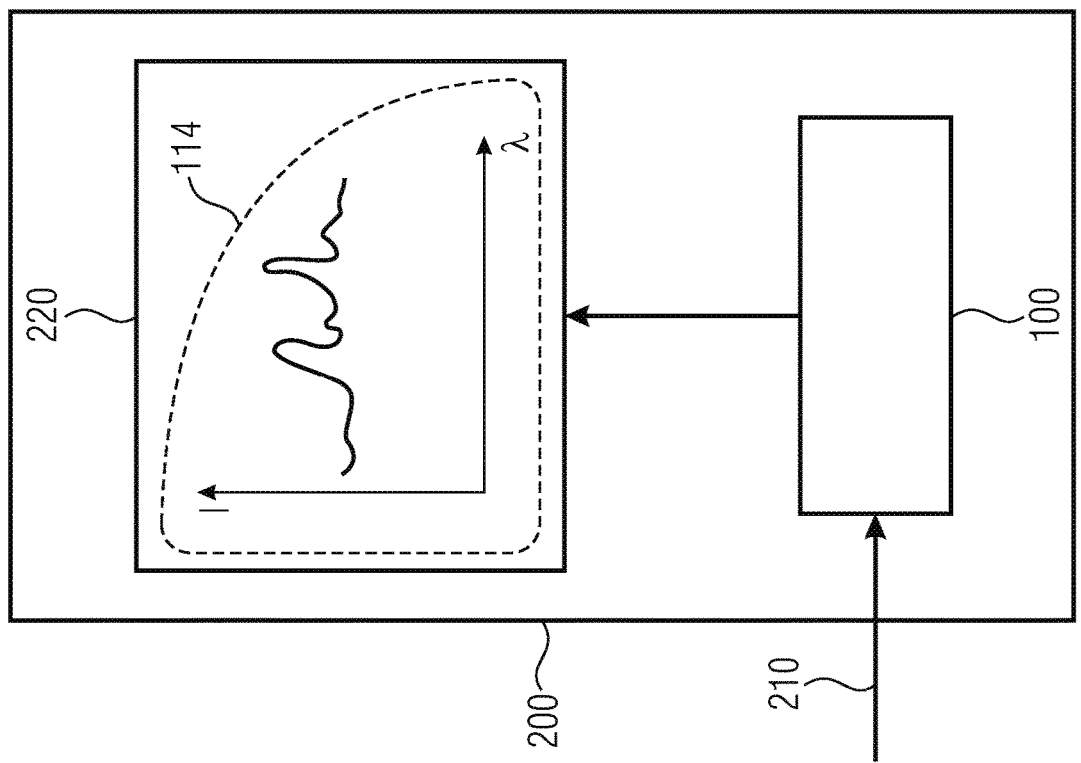
FIG. 4a shows a schematic illustration of a mobile device with a spectrometer according to an embodiment of the present invention.

FIG. 4a shows a schematic illustration of a mobile device 200 having integrated therein the spectrometer 100 described herein, according to an embodiment of the present invention. The mobile device 200 is configured to capture electromagnetic radiation 210 and to forward the same to the spectrometer 100. For example, the spectrometer 100 comprises the same functionalities as the spectrometer 100 of FIG. 1, FIG. 2, and FIG. 3. The spectrometer 100 generates a corrected spectrum 114 that is transmitted, e.g. in the form of a diagram, to a display 220 of the mobile device 200 and displayed on the display 220 to the user.

In an embodiment, the mobile device 200 with the spectrometer 100 does not comprise a display 220. In this case, the mobile device 200 may be connected to an external device such as a computer and/or a screen, wireless or wired, so as to display and/or further process the corrected spectrum on the external device.

For example, an electronics assembly of the mobile device 200 for the spectrometer 100 performs a storage of the correction function, calculations concerning the application of the correction function to the captured spectrum, and/or a measurement of ambient conditions. Particularly for mobile end devices (mobile device 200) such as smartphones (mobile phones), tablet computers, personal digital assistants (PDAs), notebooks, and/or GPS devices, enormous quantities of spectrometers are involved. In such devices, part of the electronic infrastructure already included may be used for the operation of the spectrometer.

Thus, e.g., as schematically shown in FIG. 4b, part of the electronics assembly of the mobile device 200 may form the processing means 140 of the spectrometer 100 according to an embodiment of the present invention. For example, the mobile device 200 of FIG. 4b may comprise the same functionalities as the mobile device 200 of FIG. 4a. For example, electromagnetic radiation 210 is captured by the mobile device 200 in FIG. 4b and forwarded to the spectrometer 100. The spectrometer 100 spectrally divides the electromagnetic radiation 210 and detects a captured spectrum that it forwards to the processing means 140. The processing means 140 retrieves a correction function from an internal memory of the spectrometer 100, or retrieves a correction function from an internal memory of the mobile device 200, or from a cloud, or from another external device via which the mobile device 200 is wirelessly connected. The processing means 140 applies the correction function thus obtained to the captured spectrum of the spectrometer 100 and generates a corrected spectrum 114 that is displayed on the display 220 of the mobile device 200, for example.

Figure 5:
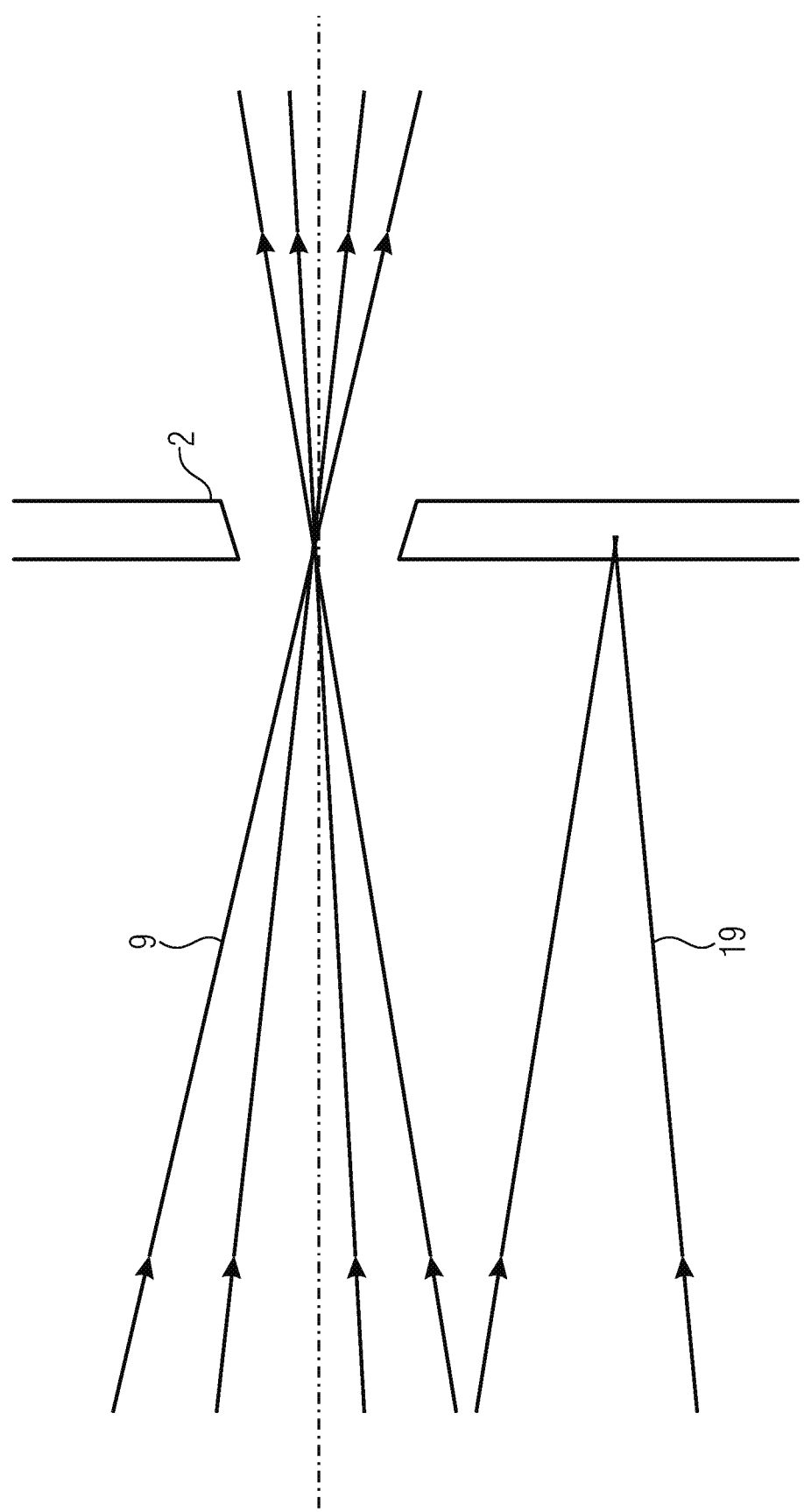
FIG. 5 shows a schematic illustration of a sectional enlargement of the exit opening of a spectrometer according to an embodiment of the present invention.

FIG. 5 shows a schematic illustration of an exit opening 2 (e.g. a sectional enlargement of the exit opening 2 of the spectrometer 100 illustrated in FIG. 3) with a beam of rays 9 of the diffracted radiation that passes through the slit (exit opening 2) according to an embodiment of the present invention. In this example, the focus position of the spectrometer having associated therewith the exit opening 2 is correctly adjusted. The focus is located at the slit position, which is why the nominal resolution of the spectrometer is achieved with an adjustment. A second beam 19 belonging to the radiation of another wavelength is fully blocked at the slit 2, which is why only light with a certain wavelength may selectively pass through the exit opening 2.

In the conventional technology, the components of the optical system of the spectrometer had to be elaborately adjusted so that the focus is located at the slit position, as illustrated in FIG. 5. For example, with the spectrometer described herein, this adjustment is no longer necessary. The processing means 140 of the spectrometer applies a correction function to the captured spectrum so as to reduce aberrations, such as a wrong focus position, and generate a corrected spectrum having hardly any deviations from a captured spectrum with an accurate focus position, as exemplarily illustrated in FIG. 5.

Figure 6:
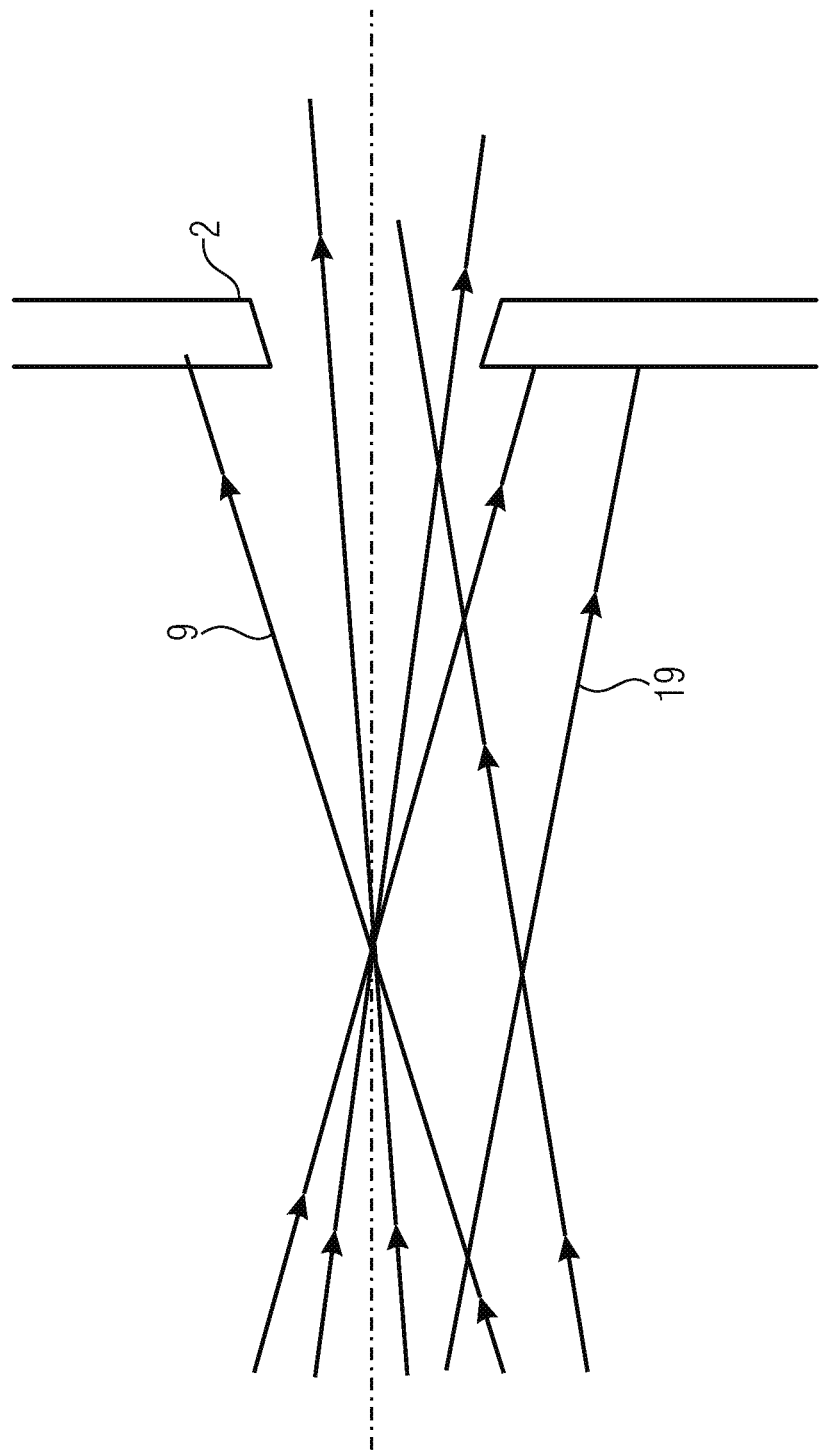
FIG. 6 shows a schematic illustration of a sectional enlargement of an exit opening of the spectrometer if defocus is present as an aberration.

Same as FIG. 5, FIG. 6 shows an exit opening 2 with a beam of rays 9 of the diffracted radiation according to an embodiment of the present invention. In contrast to FIG. 5, a defocus is present here as an example of an aberration. The radiation 9 is focused in front of the slit (exit opening 2). This means that not all of the radiation can pass through the slit. Furthermore, radiation of the beam 19 of a different wavelength can also partially pass through the slit, leading to a reduced spectral resolution.

The spectrometer described herein may comprise an aberration as shown in FIG. 6 and, for example, at least partially compensate the aberration by application of a correction function to the captured spectrum through the processing means so as to provide a corrected spectrum. Thus, with the spectrometer described herein, aberrations of the spectrometer no longer have to be reduced by adjustment of components of an optical system of the spectrometer after production of the spectrometer. Thus, the spectrometer described herein can be manufactured more easily and at lower costs.

Figure 7:
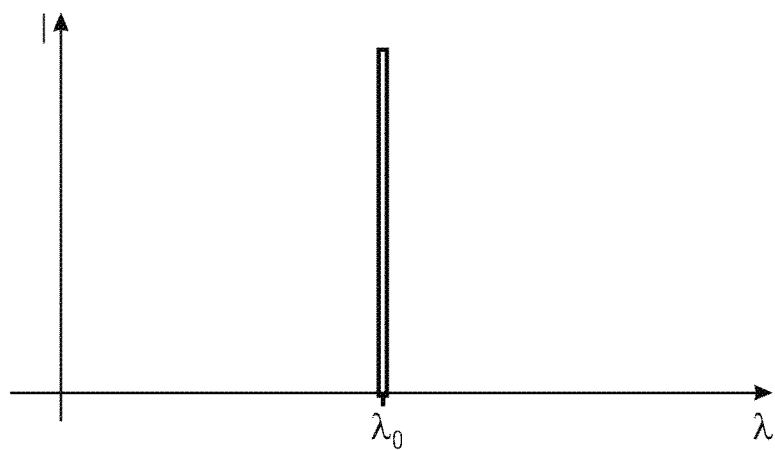
FIG. 7 shows a diagram of a very narrow-band spectrum of a reference source for determining a correction function for the spectrometer according to an embodiment of the present invention.

FIG. 7 shows a very narrow-band spectrum of a reference source, e.g., which may be used as an input signal into the spectrometer 100 in FIG. 1, FIG. 2, FIG. 3, FIG. 4a, and/or FIG. 4b for determining a correction function according to an embodiment of the present invention. For example, the spectral bandwidth of the peak of the spectrum considered here can be significantly smaller than the spectral resolution performance of the spectrometer 100. In other words, the spectral peak bandwidth is advantageously neglectable with respect to the nominal resolution (without significant aberrations) of the spectrometer. The diagram in FIG. 7 shows the intensity as a function of the wavelength. Considering that the spectral sample values of the spectrometer are spectrally often a lot closer than the nominal resolution of the spectrometer in practice, i.e. oversampling is realized, it may be sufficient for the reference spectrum's half-width, which should be smaller than the nominal resolution of the spectrometer, to be smaller than 2 times, or smaller than, the spectral sampling distance of the spectrometer, for example. As mentioned above, several measurements may be performed with reference source spectra of different maximum wavelengths $\lambda_0$. In addition, a reference spectrum with several peaks or several spectral lines in the spectral range of the captured spectrum of the spectrometer may be used.

Figure 8:
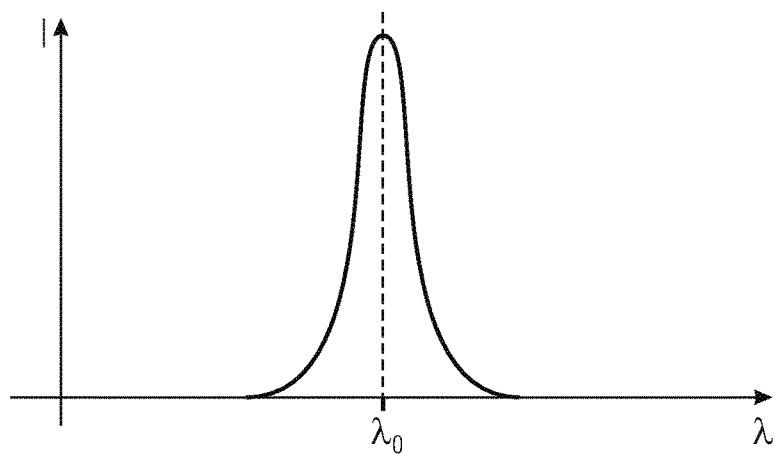
FIG. 8 shows a diagram of a captured reference spectrum with a spectrometer with a correct focus position according to an embodiment of the present invention.

For example, FIG. 8 shows a diagram of a spectrum that the spectrometer 100 in FIG. 1, FIG. 2, FIG. 3, FIG. 4a, and/or FIG. 4b would capture with a correct focus position, e.g., as illustrated in FIG. 5, for the input signal as illustrated in FIG. 7, for example. The spectrum illustrated in FIG. 6 is captured at a nominal resolution of the system. The diagram shows the intensity as a function of the wavelength.

Figure 9:
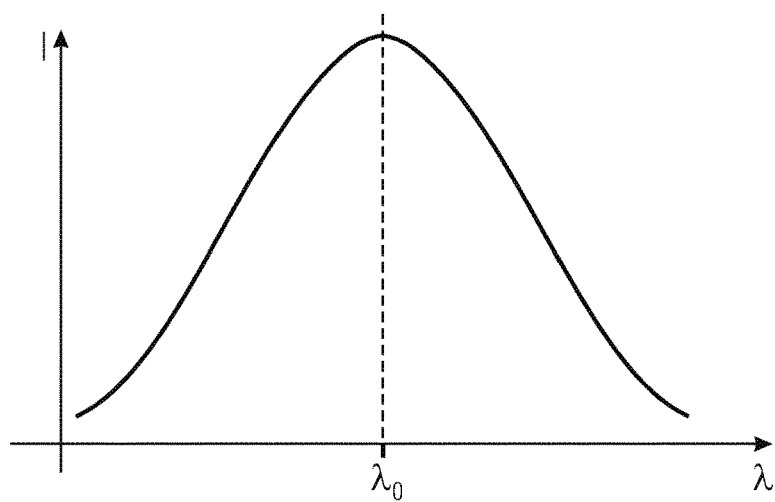
FIG. 9 shows a diagram of a reference spectrum of a spectrometer with a defocus according to an embodiment of the present invention.

FIG. 9 shows in a diagram the spectrum belonging to the input signal of FIG. 7, which the spectrometer would capture with a defocus, e.g. illustrated in FIG. 6, according to an embodiment of the present invention, consequently a reduced spectral resolution of the system. However, since the input signal (cf. FIG. 7) comprises a neglectable spectral bandwidth, e.g., the captured signal (spectrum in the diagram of FIG. 9) contains information about the aberrations, here particularly the defocus. The resulting spectral function may be used as a basis for the correction function for any captured spectra. The diagram shows the intensity as a function of the wavelength.

Figure 10:
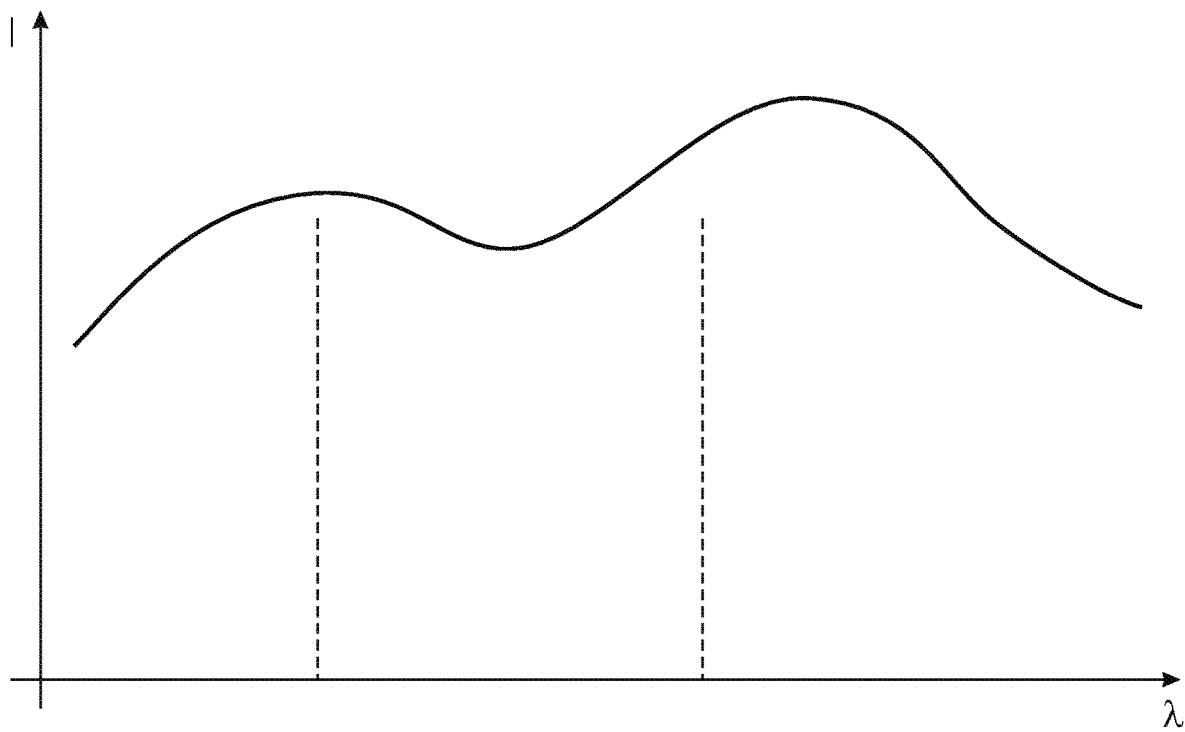
FIG. 10 shows a diagram of a spectrum captured by a spectrometer according to an embodiment of the present invention.

FIG. 10 shows a diagram that exemplary illustrates a spectrum captured with the spectrometer (as in FIG. 1, FIG. 2, FIG. 3, FIG. 4a, and/or FIG. 4b) according to an embodiment of the present invention, wherein aberrations are present in the system (e.g. the optical system). The aberrations lead to a loss of resolution and details in the spectrum. The diagram shows the intensity as a function of the wavelength.

Figure 11:
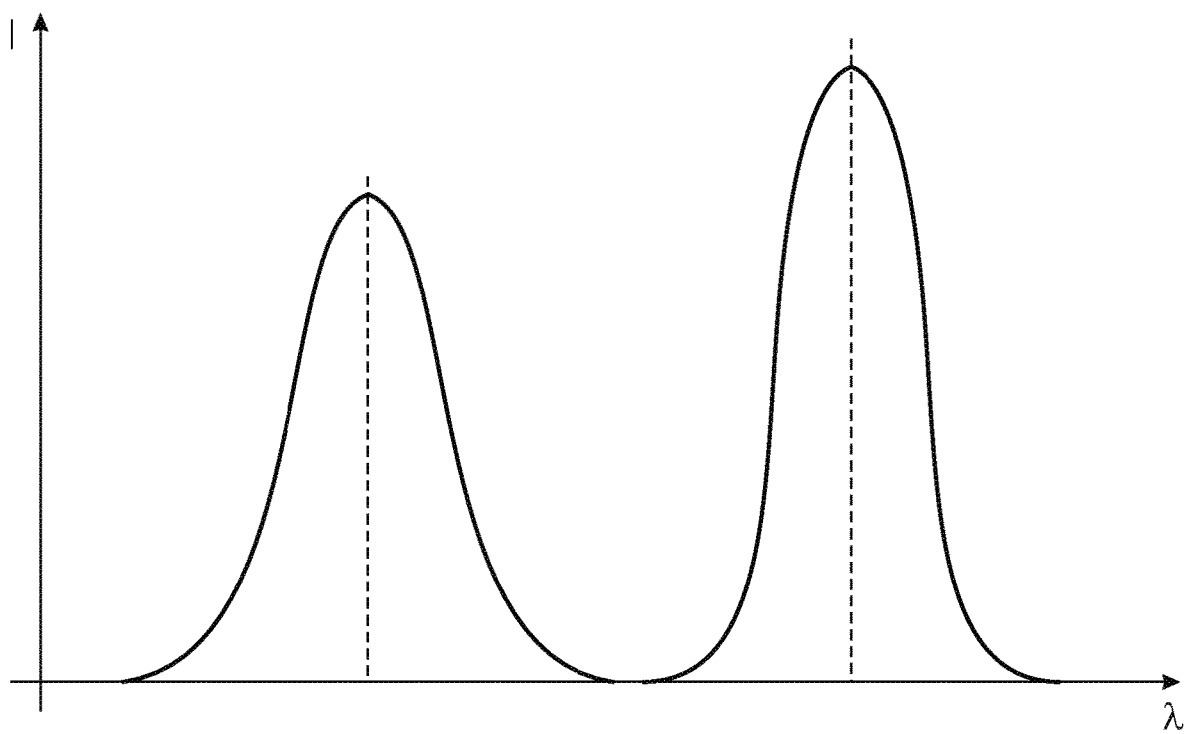
FIG. 11 shows a schematic illustration of a corrected spectrum of a spectrometer according to an embodiment of the present invention.

FIG. 11 shows a diagram that exemplarily shows how a corrected spectrum, e.g. of the captured spectrum in FIG. 10, may look after applying the correction function, according to an embodiment of the present invention. The diagram shows the intensity as a function of the wavelength.

The difference between FIG. 10 and FIG. 11 shows that the spectrometer described herein may improve the spectral resolution of a spectrometer having aberrations without elaborate engagement in the optomechanical hardware of the spectrometer.

Figure 12:
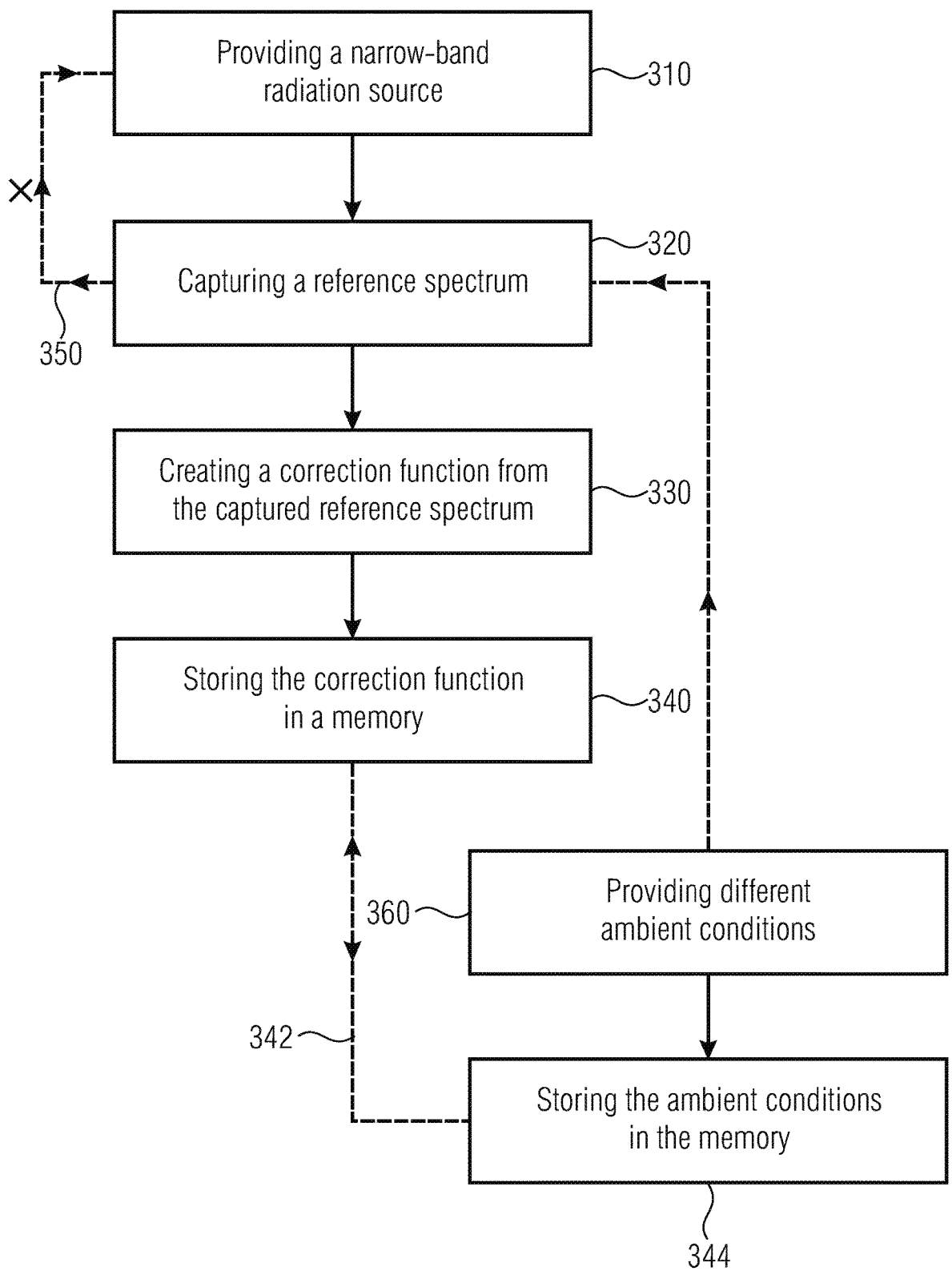
FIG. 12 shows a block diagram of a method for determining a correction function for the imaging correction of a spectrum captured by a spectrometer according to an embodiment of the present invention.

FIG. 12 shows a block diagram for an embodiment of a method according to an embodiment of the present invention. The method is provided for determining a correction function for the aberration correction of a spectrum captured with a spectrometer. To determine the correction function, first, a narrow-band radiation source is provided to the spectrometer 310. The narrow-band radiation source represents a reference radiation source. The reference radiation source for capturing 320 the reference spectrum comprises a laser or a narrow-band LED or a narrow-band thermal radiation source or a line radiator. In a further step of the method, the spectrometer captures a reference spectrum of the reference radiation source 320 so as to obtain a captured reference spectrum. In this case, a peak of the spectrum of the reference radiation source comprises a bandwidth that is smaller than a spectral resolution performance of the spectrometer. A further step of the method includes creating 330 a correction function from the captured reference spectrum so that, when applying the correction function to captured spectra captured by the spectrometer, corrected spectra that are little affected by aberrations of an imaging optic of the spectrometer are obtained. In a further step, the method includes saving 340 the correction function in a memory. In this case, e.g., the memory may be located in the spectrometer, or it may be realized as a cloud or a memory in an external device, for example. For example, if the memory is realized as a cloud or as a memory in an external device, the spectrometer is connected to the memory in a wireless or wired manner, for example.

For example, the method for determining the correction function may be carried out once, advantageously when starting the spectrometer. In this case, determining the correction function may be performed with an input signal whose spectral bandwidth is negligible or at least very small with respect to the requested device resolution. For example, in contrast to other methods in the conventional technology, the exact shape of the optical input signal (reference radiation source) does not have to be known. This correction function may also be used in later measurements, e.g. in the form of a convolution or inverse convolution (other, more complicated approaches are conceivable), for the correction of spectra. In terms of the optical imaging in the spectrometer, e.g., the correction function is a type of a spectral point spread function (no comparison spectrum as in the conventional technology). However, it may vary across the spectral range. Thus, depending on the embodiment of the spectrometer, the correction function might have to be determined at several locations in the spectral range.

In an embodiment, capturing 320 may be performed with one or several reference spectra once or multiple times, wherein the one or the several reference spectra may comprise several peaks whose respective spectral width is smaller than the spectral resolution performance of the spectral analysis system, and that comprise a different spectral position with respect to each other so as to obtain a plurality of captured impulse response spectra, wherein creating a correction function is performed on the basis of the plurality of impulse response spectra.

In an embodiment, capturing 320 is repeated for several reference spectra 350, each comprising a peak with a spectral width that is smaller than the spectral resolution performance of the spectrometer, and each having a different spectral position, such as their respective maximums, with respect to each other so as to obtain a plurality of captured reference spectra, or a plurality of capturings of impulse responses, i.e. of impulse responses at different spectral locations of the spectrometer spectrum. For example, capturing several reference spectra is repeated x times, wherein x≥2. Thus, for example, with x=7, 7 narrow-band radiation sources may be provided to the spectrometer 310, wherein a first narrow-band radiation source comprises a wavelength of, e.g., 400 nm, a second narrow-band radiation source comprises a wavelength of 450 nm, a third narrow-band radiation source comprises a wavelength of 500 nm, a fourth narrow-band radiation source comprises a wavelength 550 nm, a fifth narrow-band radiation source comprises a wavelength of 600 nm, a sixth narrow-band radiation source comprises a wavelength of 650 nm, and a seventh narrow-band radiation source comprises a wavelength of 700 nm. Thus, the reference radiation sources have a different spectral location of the maximum relative to each other. For example, for each of these reference radiation sources, a reference spectrum is captured 320. Creating 330 a correction function is performed on the basis of the plurality of reference spectra. The spectral position of the narrow-band reference radiation sources, or their peaks, may be arbitrarily selected according to the application purpose of the spectrometer, e.g., wavelength for human beings may be selected in the visible spectrum; however, wavelengths may also be selected outside of this range, such as X-radiation, ultraviolet radiation, infrared radiation, terahertz radiation, microwaves, and the like. Due to the fact that the reference spectrum is repeatedly captured 320 for several references spectra 350, the correction function created on the basis of the plurality of captured reference spectra 330 may minimize aberrations of the spectrometer depending on the spectral position of the radiation in a captured spectrum of the spectrometer. Thus, for example, the correction function handles individual aberrations of the spectrometer depending on the spectral position of the radiation. Thus, for example, the aberration defocus may be larger at one wavelength than at another wavelength. For example, these differences of the aberrations of the spectrometer are contained in the correction function, creating, when applying the correction function to a captured spectrum of the spectrometer, a corrected spectrum where influences of aberrations to the captured spectrum are minimized. Thus, an improved corrected spectrum of the spectrometer is achieved. However, it is to be noted that it is possible that the several peaks that were each individually distributed to the captured reference spectra and were each used for a respective impulse response measurement in the previous example could partially or even fully be part of a reference spectrum. In other words, several peaks of a reference spectrum contained in the spectral range of the spectrometer and each comprising a smaller spectral width than the resolution performance of the spectrometer may be used to achieve a respective impulse response measurement that may then be used to, e.g. possibly together with one or several impulse response measurements from one or several other measured reference spectra, build the previously mentioned matrix to be inverted. For example, such a multi-peak reference spectrum with several bands may be generated by calibration lamps such as Ar and Kr lamps.

In an embodiment, different ambient conditions are provided 360. For example, the reference spectrum is captured at different ambient conditions 320 so as to obtain a correction function per ambient condition 330. Thus, for example, the ambient condition may be varied such that the temperature, the humidity, the pressure, or other characteristics of the atmosphere within the spectrometer are modified. Providing different ambient conditions may be carried out, e.g., by performing the reference spectrum measurement in a climate box, e.g. via one or several elements located therein, defining the temperature and/or humidity and/or the pressure of the surroundings in which the spectrometer performs the reference spectrum measurement. Creating 330 a correction function per ambient condition, i.e. there are several correction functions for different ambient conditions, makes it possible to be able to minimize aberrations of the spectrometer in a corrected spectrum depending on different ambient conditions. Thus, e.g., due to increased temperatures in the spectrometer, the imaging optic of the spectrometer expands, resulting in the creation of larger aberrations than at lower temperatures. When the spectrometer captures a spectrum, e.g., ambient conditions may be captured via a sensor element, as a result of which a processing means of the spectrometer may apply to the captured spectrum a correction function that fits the ambient conditions so as to obtain a corrected spectrum. Thus, by determining one correction function per ambient condition, a further influence of aberrations of the spectrometer to the captured spectrum is minimized, as a result of which the corrected spectrum is improved, and the resolution capacity of the spectrometer is therefore improved.

In an embodiment, together with information about the associated ambient conditions, the correction function is saved 342 in a spectrometer's memory from which the spectral analysis system obtains knowledge about the correction function. To this end, the correction function saved in the memory 340 is linked to the ambient conditions saved in the memory 344. The memory of the spectrometer does not necessarily have to be located in the spectrometer, but it may be realized in the form of a cloud or in an external device. For example, each spectrometer has an individual memory that stores the associated correction function, as a reason of which differently produced spectrometers may comprise different aberrations that may individually be minimized by different correction functions in a corrected spectrum. Thus, correction functions are saved in a memory linked to the respective ambient conditions individually for the spectrometer, making it possible to minimize influences of ambient conditions during measurements with the spectrometer. By saving the information (e.g. the ambient conditions) and the at least one correction function in a memory of the spectrometer, the processing means of the spectrometer may quickly access the correction function that fits the measurement of the spectrometer.

In an embodiment, the correction function is available in a parametrized form. Thus, for example, the ambient conditions may be provided as parameters and, e.g., several different correction functions may be created from a single correction function in a parameter-dependent manner. This makes it possible to consume less memory space in the memory of the spectrometer and to create a corrected spectrum more efficiently with the help of the processing means of the spectrometer.

In an embodiment, creating 330 a correction function comprises creating, on the basis of the captured reference spectrum, a synthesized mapping matrix (e.g. mapping function) that simulates an effect of one or several aberrations with respect to the spectra captured by the spectrometer, and calculating a matrix inverse to the synthesized mapping matrix, which forms the correction function. For example, the synthesized mapping function may be a matrix with the spectral intensity distribution of the captured reference spectrum. Since the captured reference spectrum is based on a narrow-band radiation source, the synthesized mapping function may be understood as a point spread function. For example, a point spread function simulates the effect of an aberration or several aberrations to the spectra captured by the spectrometer. In this case, for example, the inverse point spread function is therefore the correction function. For example, the correction function created in such a way is configured to perform a deconvolution with the captured spectrum of the spectrometer so as to obtain a corrected spectrum. Due to the thus created correction function, e.g., the spectral resolution of the spectral apparatus is increased, and tolerances of optical components of the spectrometer may be loosened since the aberrations created by tolerances of optical components may be minimized with the help of the correction function as an effect to the corrected spectrum. Thus, regardless of the aberrations of the spectrometer, the influence of the aberrations to the captured spectrum of the spectrometer is reduced by calculation with the help of the correction function.

In an embodiment, the reference radiation source for capturing 320 the reference spectrum comprises a laser or a narrow-band radiation source. Thus, for example, a laser or a narrow-band radiation source is provided 310 as a reference radiation source. For example, the peak of the narrow-band reference radiation source should comprise a spectral width that is smaller than the spectral resolution performance of the spectrometer. For example, through the reference radiation source comprising a laser or a narrow-band radiation source for capturing, the captured reference spectrum may provide information about the aberrations of the spectrometer, making it possible to create a correction function from the captured reference spectrum and to apply the same to captured spectra so as to obtain corrected spectra that are less impaired by aberrations of an imaging optic of the spectrometer. Thus, by using the laser or the narrow-band radiation source, the correction function may be applied to unknown captured spectra, the influence of aberrations from said captured spectra may therefore be reduced, and a corrected spectrum increasing the resolution capacity of the spectrometer may therefore be created. In an embodiment, the spectral analysis system is impaired by aberrations of a beam-shaping or imaging optic of the spectral analysis system. The impairment consists of a spectral resolution loss of the captured spectra. The method may alleviate or compensate this resolution loss.

Figure 13:
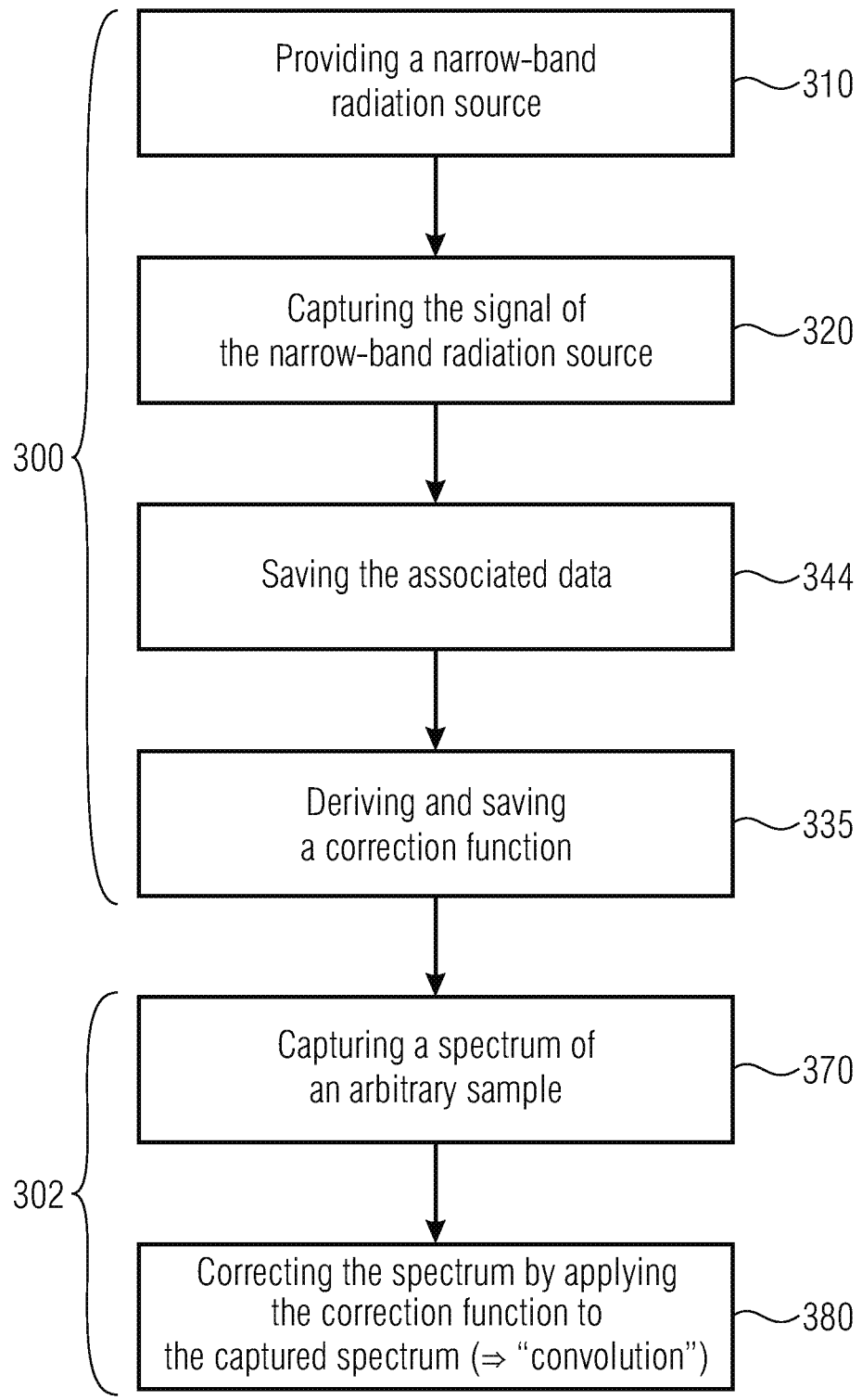
FIG. 13 shows a block diagram of a method for determining and applying a correction function of a spectrometer according to an embodiment of the present invention.

FIG. 13 shows a block diagram of an embodiment of a method 300 for determining a correction function for the imaging correction of a spectrum captured by a spectrometer, and a method 302 for applying the correction function. The method 300 and the method 302 are illustrated in FIG. 13 in a block diagram with successive steps, however, the method 300 may performed independently of the method 302, and the method 302 may performed independently of the method 300.

The method 300 includes providing 310 a narrow-band radiation source, capturing 320 the signal of the narrow-band radiation source with the spectral apparatus, storing 344 the associated data, and deriving and storing a correction function 335. For example, storing 344 the associated data includes saving the ambient conditions in a memory, however, the captured signal may also be stored. For example, the captured signal may be stored as a spectral intensity distribution. For example, the associated data may also be statistical information such as the designation/ numbering of the narrow-band radiation source, or system relevant information such as error messages. For example, the step 335, storing a correction function, may comprise the same functionality as creating 330 a correction function from the captured reference spectrum and saving 340 the correction function in a memory, as illustrated in FIG. 12.

The method 302 includes capturing 370 a spectrum of an arbitrary sample, and correcting 380 the spectrum (of the captured spectrum) by applying the correction function to the captured spectrum e.g. "convolution" or "inverse convolution"). For example, a corrected spectrum is created through the correction 380 of the spectrum. For example, the correction 380 of the spectrum is performed by a processing means of the spectrometer (the spectral apparatus).

For example, with the method 300 and the method 302, the spectral resolution of a spectral apparatus having aberrations (including defocus) may be increased by calculation, i.e. without engaging with the optomechanical hardware of the system. When building spectral apparatuses, in particular at very large quantities or very small systems, this makes it possible to in future fully refrain from the conventional process of adjustment and/or to no longer correct certain aberrations and to therefore loosen tolerances and significantly save costs. For example, aberrations are consciously accepted, wherein their effects to the resolution are corrected in the signal (spectrum) afterwards, so to speak.

According to the method 302, the captured signal or spectrum of an arbitrary sample is processed afterwards, while improving the spectral resolution of the spectrometer. A prerequisite for the implementation of such a mathematical method is a knowledge about the erroneous (aberration-afflicted) intensity distribution of the spectrally divided radiation in the focal plane of the optical path (defocus may also be considered as an aberration). Thus, for example, the correction method consists of two essential steps: 1. creating and determining 300 a correction function once, and 2. applying 302 this correction function to the measurement data of any spectral measurement. What is important in this case is that the determination 300 of the correction function may be carried out once, for example, advantageously when starting the device. In this case, the correction process may be directly implemented into the hardware of the spectrometer.

The methods 300 and 302 for increasing the spectral resolution and the associated computational effort may be optimized by the spectrometer's electronics assembly containing a data memory in which the data of captured spectra may be saved. For example, this concerns both the correction function and the captured spectra of different samples. In addition, part of the spectrometer electronics assembly may be configured such that, e.g., the computational operations needed are directly implemented in a FPGA (field programmable gate array) or DSP (digital signal processor), for example. Consequently, the spectrometer may already provide corrected spectra for further use for other devices with low time and cost requirements.

At this point, it is to be noted once more that the described methods 300 and 302 may not only be used to avoid an adjustment effort, but to simplify greatly the optical aberration correction. For example, certain image errors, such as spherical aberration, do no longer have to be corrected. For example, the residual errors are included in the correction function. This leads to the fact that the tolerances of the optical components and for the assembly of the spectrometer are usually loosened. In this sense, the use of the methods 300, 302 of FIG. 13 and the method illustrated in FIG. 12 may lead to a modified optical design strategy in which the specified error is corrected, or is actually not corrected, in favor of others.

The herein described spectrometer with the associated methods is based, among other things, on the finding that an economical production of spectrometers in medium or large quantities or very small designs is not possible with the methods currently used, but that such a production is achievable by using the above-described correction method 302, i.e. by calculation with the means of signal processing. Thus, the present invention forms the basis for a volume production of spectrometers, in turn leading to completely new application fields that were previously closed to spectroscopy.

The spectrometer and methods described herein may be described in other words using the following embodiments.

According to an embodiment, the system (spectrometer) and method for performing spectral-analytic measurements includes:

an optical system for spectrally dividing electromagnetic radiation;
at least one detector for detecting electromagnetic radiation;
an electronics assembly for driving/reading out the at least one detector (e.g. a first electronics assembly);
electronic for processing/treating measurement data or signals of the detector (e.g. a second electronics assembly or, in other words, the processing means); and
a data memory.

The optical system for spectral division may comprise optical aberrations, and the data memory may comprise data about the type of optical aberrations.

In an embodiment, the electronics assembly for processing/treating (second electronics assembly) measurement data may access the data about the type of the aberrations located in the data memory so as to manipulate/further process the measurement data.

For example, the data of the optical aberrations the data memory comprises may be present in the form of detector signals that may be correlated with the aberrations.

The data about the optical aberrations in the data memory may be used for improving the spectral resolution.

In an embodiment, the determining optical aberration is a defocus, and the associated aberration data in the data memory may be used for improving the spectral resolution. For example, the determining optical aberration may be a defocus and/or a spherical aberration and/or coma and/or astigmatism, or a combination of these aberrations and the associated aberration data in the data memory and it may be used for improving the spectral resolution.

In an embodiment, the system for spectrally dividing electromagnetic radiation may be configured as a monochromator, or polychromator, or as a device for hyperspectral image capturing.

The detector for electromagnetic radiation may comprise a plurality of detector elements.

In an embodiment, the spectrometer (system) may comprise a sensor for measuring the temperature, and a data memory that stores the data for different temperatures.

Manipulating/further processing the measurement data with the help of the data from the data memory may be performed with an algorithm or a correction function implemented in a part of the electronics assembly of the spectrometer.

The spectrometer may optionally comprise an integrated radiation source for electromagnetic radiation.

Optionally, the spectrometer may be integrated into a mobile end device. Part of the electronics assembly of the end device may be used to manipulate/further process the measurement data.

In an embodiment, a method for improving the spectral resolution of the spectrometer is provided, the method comprising:
providing a narrow-band radiation source (reference source) for electromagnetic radiation
capturing the narrow-band spectrum of the radiation source with the spectrometer in the form of a detector signal depending on a wavelength or wave number or frequency of the radiation
saving the data of the detector signal in the data memory
creating a correction function from the captured data
capturing a spectrum of an arbitrary sample
applying the correction function to the captured spectrum of the sample to improve the spectral resolution In an embodiment, it may be sufficient to determine the correction function only once and to write the associated data into the memory.

Determining the correction function may be performed with electromagnetic radiation comprising a smaller spectral bandwidth compared to the spectral resolution of the spectral apparatus.

For example, the data of the aberrations is present as a spectral intensity distribution.

Optionally, determining the correction function may be performed at several locations in a spectrum, and the associated data may be saved in the data memory.

Applying the correction function may comprise a mathematical convolution or inverse convolution or a Fourier or inverse Fourier transformation The correction function may be different for different ranges of a spectrum.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device, or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Spectral analysis system for capturing a spectrum with an optic that forms an optical path,
   wherein spectral analysis system is configured to apply a correction function to a captured spectrum so as to acquire a modified spectrum;
   wherein the correction function is generated by a method for determining a correction function for a spectrum captured by a spectral analysis system, comprising:
   capturing a reference spectrum of a reference radiation source with the spectral analysis system so as to acquire a captured reference spectrum, wherein the spectrum of the reference radiation source comprises a peak with a spectral width that is smaller than a spectral resolution performance of the spectral analysis system,
   creating a correction function from the captured reference spectrum so that, when applying the correction function to captured spectra captured by the spectral analysis system, modified spectra that are less impaired by errors of an optic of the spectral analysis system are acquired.

2. Spectral analysis system according to claim 1, wherein the correction function is acquired by measuring one or several measured impulse responses.

3. Spectral analysis system according to claim 1, wherein the correction function is present in the form of a matrix that, when applied to the captured spectrum, results in the modified spectrum.

4. Spectral analysis system according to claim 3, wherein the matrix is an inverse of a matrix built from one or several measured impulse responses.

5. Spectral analysis system according to claim 3, wherein the matrix is an inverse of a matrix that distributes each spectral sample value of an actual or undisturbed spectrum with a given impulse response onto the spectrally corresponding sample value and the spectrally surrounding sample values of a simulated captured spectrum, and that accumulates the thus acquired contributions for all sample values of the simulated captured spectrum.

6. Spectral analysis system according to claim 1, configured to perform an integral transformation or a matrix manipulation when applying the correction function.

7. Spectral analysis system according to claim 6, wherein the integral transformation comprises a convolution or a FFT and/or the matrix manipulation comprises a matrix multiplication.

8. Spectral analysis system according to claim 1, configured to determine and/or apply the correction function depending on an ambient condition of the spectral analysis system.

9. Spectral analysis system according to claim 1, wherein the spectral analysis system comprises the following elements:
   an optical system with the optic, wherein the optical system is configured to spectrally divide electromagnetic radiation, and wherein the optical system is a monochromator, a polychromator, or a device configured to perform hyperspectral image capturings, and
   at least one detector element configured to detect the electromagnetic radiation divided by the optical system.

10. Spectral analysis system according to claim 9, comprising entry and exit openings that are round, oval, rectangular, crescent-shaped, arched, rectangularly pulvinated or rectangularly drum-shaped.

11. Spectral analysis system according to claim 1, wherein the spectral analysis system comprises an optical system with the optic and is configured to spectrally divide electromagnetic radiation, and comprises at least one detector element configured to detect the electromagnetic radiation divided by the optical system, and wherein
   the optical system does not comprise any adjustment elements, or
   wherein the optical system does not comprise mechanical actuators to correct aberrations after or during the production of the spectral analysis system, or
   wherein an entry opening, an exit opening, and components of the optical system are mounted fixed and adjustment-free with respect to each other.

12. Spectral analysis system according to claim 1, wherein the correction function is stored in the spectral analysis system.

13. Spectral analysis system according to claim 1, comprising:
   a memory for storing the correction function, or
   a processing unit for performing calculations concerning the application of the correction function, or
   a sensor element for capturing an ambient condition.

14. Mobile device having integrated a spectral analysis system according to claim 1.

15. Mobile device according to claim 14, wherein an electronics assembly of the mobile device performs for the spectral analysis system a storage of the correction function and/or captured spectra, calculations concerning the application of the correction function to the captured spectrum, and/or an ambient condition measurement, and/or stores the spectrum modified by the application of the correction function.

16. Method for determining a correction function for a spectrum captured by a spectral analysis system, comprising:
   capturing a reference spectrum of a reference radiation source with the spectral analysis system so as to acquire a captured reference spectrum, wherein the spectrum of the reference radiation source comprises a peak with a spectral width that is smaller than a spectral resolution performance of the spectral analysis system,
   creating a correction function from the captured reference spectrum so that, when applying the correction function to captured spectra captured by the spectral analysis system, modified spectra that are less impaired by errors of an optic of the spectral analysis system are acquired.

17. Method according to claim 16, wherein the spectral analysis system is impaired by aberrations of a beam-shaping or imaging optic of the spectral analysis system, wherein the impairment comprises a spectral resolution loss of the captured spectra.

18. Method according to claim 16, wherein the spectral analysis system is spectral analysis system for capturing a spectrum with an optic that forms an optical path,
   wherein spectral analysis system is configured to apply a correction function to a captured spectrum so as to acquire a modified spectrum.

19. Method according to claim 16, wherein capturing is performed once or multiple times with one or several reference spectra, wherein the one or the several reference spectra together comprise several peaks whose respective spectral width is smaller than the spectral resolution performance of the spectral analysis system, and that comprise a different spectral position with respect to each other, so as to acquire a plurality of captured impulse response spectra, wherein creating a correction function is performed on the basis of the plurality of impulse response spectra.

20. Method according to claim 16, wherein the reference spectrum is captured at different ambient conditions so as to create one correction function per ambient condition.

21. Method according to claim 16, wherein, together with information about the associated ambient conditions, the correction function is saved in a memory from which the spectral analysis system acquires knowledge about the correction function.

22. Method according to claim 16, wherein creating the correction function comprises creating, on the basis of the captured reference spectrum, a synthesized mapping function that simulates an effect of one or several aberrations with respect the spectra captured by the spectral analysis system, and calculating a mapping function that is inverse to the synthesized mapping function.

23. Method according to claim 16, wherein creating the correction function comprises creating, on the basis of the captured reference spectrum, a synthesized mapping matrix that simulates an effect of one or several aberrations with respect to the spectra captured by the spectral analysis system, and calculating a matrix that is inverse to the synthesized mapping matrix and that forms the correction function.

24. Method according to claim 16, wherein creating and/or applying the correction function is iterative or non-iterative.

25. Method according to claim 16, wherein the reference radiation source for capturing the reference spectrum comprises a laser or a narrow-band LED or a narrow-band thermal radiation source or a line radiator.

26. A non-transitory digital storage medium having a computer program stored thereon to perform the method for determining a correction function for a spectrum captured by a spectral analysis system, comprising:
  capturing a reference spectrum of a reference radiation source with the spectral analysis system so as to acquire a captured reference spectrum, wherein the spectrum of the reference radiation source comprises a peak with a spectral width that is smaller than a spectral resolution performance of the spectral analysis system,
  creating a correction function from the captured reference spectrum so that, when applying the correction function to captured spectra captured by the spectral analysis system, modified spectra that are less impaired by errors of an optic of the spectral analysis system are acquired,
  when said computer program is run by a computer.

27. Spectral analysis system for capturing a spectrum with an optic that forms an optical path,
  wherein spectral analysis system is configured to apply a correction function to a captured spectrum so as to acquire a modified spectrum;
  wherein spectral analysis system is configured to determine and/or apply the correction function depending on an ambient condition of the spectral analysis system.

28. Mobile device having integrated a spectral analysis system according to claim 27.

\* \* \* \* \*